United States Patent
Liang et al.

(10) Patent No.: US 9,374,982 B2
(45) Date of Patent: Jun. 28, 2016

(54) PET GROOMER AND VACUUM CLEANER

(71) Applicant: Suzhou Vacs Electrical Co., Ltd., Taiping Town (CN)

(72) Inventors: Yu Liang, Taiping Town (CN); Jinsong Peng, Taiping Town (CN)

(73) Assignee: SUZHOU VACS ELECTRICAL CO., LTD., Suzhou, Jiangsu (CN)

( * ) Notice: Subject to any disclaimer, the term of this patent is extended or adjusted under 35 U.S.C. 154(b) by 622 days.

(21) Appl. No.: 13/761,393

(22) Filed: Feb. 7, 2013

(65) Prior Publication Data

US 2013/0145992 A1 Jun. 13, 2013

(30) Foreign Application Priority Data

May 25, 2012 (CN) .......................... 2012 1 0166508
Aug. 9, 2012 (CN) .......................... 2012 1 0282678

(51) Int. Cl.
*A01K 13/00* (2006.01)
*A47L 9/06* (2006.01)
*A47L 7/00* (2006.01)

(52) U.S. Cl.
CPC ............... *A01K 13/00* (2013.01); *A01K 13/002* (2013.01); *A47L 7/0066* (2013.01); *A47L 9/0613* (2013.01)

(58) Field of Classification Search
CPC ..... A01K 13/001; A01K 13/00; A45D 24/32; A45D 20/52; A45D 24/40; A46B 13/02; A46B 7/10; A47L 7/0066; A47L 7/009; A47L 9/0613; A47L 11/4044
USPC ......... 119/608, 600, 601, 609, 611, 613, 616, 119/625, 626; 15/402, 410; 132/112
See application file for complete search history.

(56) References Cited

U.S. PATENT DOCUMENTS

| | | | | |
|---|---|---|---|---|
| 1,894,905 A | * | 1/1933 | Fechtenberg | A47L 9/02 132/116 |
| 2,953,808 A | * | 9/1960 | Carmack | A45D 24/32 132/125 |
| 3,308,500 A | * | 3/1967 | Woodruff | A01K 13/002 119/606 |
| 3,626,546 A | * | 12/1971 | Dove | A01K 13/002 15/373 |
| 3,668,736 A | * | 6/1972 | Loscalzo | A47L 9/06 15/347 |
| 4,630,329 A | | 12/1986 | Shores | |
| 4,799,460 A | * | 1/1989 | Kuhl | A01K 13/002 119/606 |
| 5,095,853 A | * | 3/1992 | Kruger | A01K 13/002 119/606 |

(Continued)

FOREIGN PATENT DOCUMENTS

CN 101889557 A 11/2010
JP 2009-148398 A 7/2009

*Primary Examiner* — Yvonne Abbott-Lewis
(74) *Attorney, Agent, or Firm* — Im IP Law PLLC; C. Andrew Im

(57) ABSTRACT

A pet groomer and vacuum cleaner including the pet groomer are provided. The pet groomer includes a substance body having a suction channel to be connected with the suction hose of vacuum cleaner and has at least one air intake which transmits air to the suction channel; a combing assembly which is used to comb pet hair; and a driving assembly which drives the combing assembly so as to make the comb teeth in the combing assembly to move to the air intake from a comb position. The pet groomer drives the combing assembly through the driving assembly so as to move pet hair which is combed from pet body to the air intake to be vacuumed away by the vacuum cleaner directly, avoiding the intermediate action of stripping off pet hair from comb teeth or similar actions, so that pet hair will not fall down and environmental pollution and allergen spreading will not be caused by pet hair.

21 Claims, 20 Drawing Sheets

(56) References Cited

U.S. PATENT DOCUMENTS

| | | | |
|---|---|---|---|
| 5,115,765 A * | 5/1992 | El Omary | A01L 13/002 119/606 |
| 5,339,840 A | 8/1994 | Koppel | |
| 5,462,018 A * | 10/1995 | Louison | A01K 13/002 119/626 |
| 5,768,748 A * | 6/1998 | Silvera | A01K 13/001 119/602 |
| 6,055,938 A | 5/2000 | Klein | |
| D444,925 S * | 7/2001 | Monette | D30/158 |
| 6,681,775 B2 | 1/2004 | Wang | |
| 7,096,598 B1 * | 8/2006 | Myatt | A45D 20/52 34/96 |
| 7,621,234 B2 * | 11/2009 | Roy | A01K 13/002 119/613 |
| 8,082,887 B2 * | 12/2011 | Fernandez | A01K 13/002 119/612 |
| 8,132,541 B1 * | 3/2012 | Baer, Jr. | A01K 13/002 119/664 |
| 8,555,463 B1 * | 10/2013 | Laube | A01K 13/001 119/606 |
| 8,857,011 B2 * | 10/2014 | Casper | A01K 13/001 15/344 |
| 9,010,276 B1 * | 4/2015 | Nevitt | A45D 24/32 119/611 |
| 2009/0126649 A1 | 5/2009 | Porter et al. | |
| 2010/0294209 A1 | 11/2010 | Dyson et al. | |
| 2010/0294210 A1 | 11/2010 | Dyson et al. | |
| 2011/0030620 A1 * | 2/2011 | Jouan | A01K 13/002 119/611 |
| 2011/0180013 A1 | 7/2011 | Kissel, Jr. | |
| 2012/0285395 A1 | 11/2012 | Freidell | |
| 2014/0026822 A1 * | 1/2014 | Harris, II | A01K 13/002 119/628 |
| 2015/0250141 A1 * | 9/2015 | Ferrentino | A47L 9/06 119/610 |

* cited by examiner

PET GROOMER AND VACUUM CLEANER

RELATED APPLICATION

The present application claims the benefit of the following Chinese Patent Applications: CN201210166508.X filed May 25, 2012 and CN201210282678.4 filed Aug. 9, 2012, each of which is incorporated herein by reference in its entirety.

BACKGROUND OF THE INVENTION

The invention relates to a pet groomer and a vacuum cleaner includes the pet groomer.

Generally, pet owners use brushes to comb their pet. The loose hair that combed from pets are comparatively thin and broken, easily flying with the wind, and can contain allergens or various bacteria and throw threats to or even destroy health of people, especially to children and sensitive people. Loose hair combed down by traditional brush can scatter in the air or on the ground or twined in comb teeth, user has to clear twined hair by hand from comb teeth. In the process, user is exposed to or even harmed by bacteria and/or allergen contained in pet hair. Besides, most comb teeth are relatively sharp and intensively arranged, so user may get hurt when clearing twined hair manually.

In order to solve the problems above, U.S. Pat. No. 6,681,775 (Wang) discloses a pet brush comprised of a front plate and a base plate, lots of holes corresponding to comb teeth are set in the front plate, with many comb teeth planted on base plate which extends outside of corresponding holes in the front plate, when it is necessary to comb a pet, user operate controlling key to extend comb teeth out, then the comb teeth withdraw from corresponding holes by operating the controlling key after pet hair combed, combed hair will be stripped off comb teeth by the front plate and then dumped into trash can. Since combed loose hair can scatter in all directions when falling into trash can from comb teeth, allergens and/or bacteria may spread to pollute environment, and besides, user has to operate the controlling key in every combing process to strip off hair in comb teeth and holding the pet brush, put it into the trash can. It is inconvenience and labor waste.

Based on the above, CN201010189748.2 discloses a vacuum cleaner attachment. The attachment can be connected with vacuum cleaning equipment through a pipe, the external wall of the pipe serves as an operating handle, the overlying front plate and base plate are at the other end of the pipe, many bristle-type comb teeth are planted in the base plate, the front plate has many holes and an air inlet connected with the main suction channel of vacuum cleaner, and comb teeth in the base plate extend or withdraw through holes in the front plate. A controlling key with a spring is set near the pipe handle, user operate the controlling key to move towards the pipe handle direction, to drive comb teeth to extend outwards through the holes on front plate and enter the combing status. After pet hair transferred to comb teeth, user relaxes finger to let comb teeth withdraw, meanwhile the airflow speed at the air inlet suction hole becomes higher to vacuum loose hair after it is stripped off comb teeth by the front plate. Since loose hair firstly stripped from comb teeth can fall down freely due to insufficient suction force of the main suction channel, and as the air intake direction is vertical to the front plate scattered with stripped hair, the pet hair which is at the rim of the front plate can't be completely vacuumed away easily. Furthermore, in order to avoid excessive suction force which affects comfort of pet, the suction force at the air intake hole cannot be too strong. In practice, hair stripped off from rim comb teeth can stuck on front plate after comb teeth withdrawn, user must extend and withdraw comb teeth repeatedly to move residual hair into suction hole completely, sometimes still have to use fingers to help in the final. This can obviously increase the chance of hair and allergen spreading to cause secondary pollution. Therefore, the risk that furs and allergens spread to cause secondary pollution can be increased. If there have fleas hide inside the hair combed down, they may be exposed in air on the front plate in the end of each incomplete stripping/vacuuming cycle and get chance to jump around. Many stripping and vacuuming cycles needed to comb a pet, incomplete vacuuming can multiply the chance of flea spreading. Moreover, the controlling key of the tool should be pressed to extend comb teeth outwards, and user should press the controlling key constantly during the combing process, it can be tiring for use. As the length of comb teeth is fixed, it is uneasy to control the length of comb teeth extended outside of the front plate to fit different pet hair length. Shorter extended teeth can not comb deep enough for pets with thick hair, and longer extended teeth can hurt pets with thin hair. In order to maximize effective suction at the air inlet hole in the front plate, the tool welds different components together which makes it very difficult for consumer to replace comb teeth. If one or more comb teeth damaged, consumer will have to buy a new product. Besides, it is unavoidable that some pet hair drop in the gap of welded parts in use, it is hard for user to clean.

BRIEF SUMMARY OF THE INVENTION

Targeting at the problems above, the present invention provides a pet groomer which is used in conjunction with the suction hose of a vacuum cleaner, comprising: a substance body which has a suction channel that is used to be connected with the suction hose and has at least one air intake which transmits air to the suction channel; a combing assembly which is used to comb pet hair; and a driving assembly which drives said combing assembly so as to make comb teeth in combing assembly to move to the air intake from a comb position.

As the embodiment 1 of the invention, the pet groomer can also has the following features: the substance body also has a hollow front section which is placed outside of the air intake and the hollow front section has a comb use opening; the combing assembly is consisted of a rotatable body and a plurality of groups of the comb teeth distributed in the axial direction of the rotatable body; The rotatable body is installed inside of the hollow front section, at least one group of the comb teeth extends outwards from the comb use opening to comb pet hair, and a rotation accepting assembly is set at one end of the rotatable body; the driving assembly is formed from a knob drive assembly, the knob drive assembly has a drive unit and a knob in conjunction with the drive unit, the drive unit penetrates through aside wall of the hollow front section inosculating with the rotation accepting assembly, and the knob is exposed on external surface of the hollow front section.

Further, the pet groomer of the invention in embodiment 1 can also has the following features: the driving assembly also has a rotation angle locating section which locates the rotation angle of the rotatable body.

Further, the pet groomer of the invention in embodiment 1 can also has the following features: the rotation angle locating section has a 3-tooth positioning block which surrounds the rotation accepting assembly, and ensures the knob drives the rotatable body to rotate by 120° every time; the comb teeth has three groups, the circular pitch between two neighbor groups is 120°, and the air intake is set at the position 120° rotated from the comb position.

Further, the pet groomer of the invention in embodiment 1 can also has a position limiting unit, a ratchet wheel is set at the other end of the rotatable body, the position limiting unit is consisted of the ratchet wheel and a position limiting plate which is meshed with the ratchet wheel, and when the rotatable body rotates by the said rotation angle, the position limiting plate and the ratchet wheel are meshed to prevent the comb teeth from leaving the comb position.

Further, the pet groomer of the invention in embodiment 1 can also has the following features: the hollow front section also has an air leakage opening which may prevents excessive air force in the comb use opening from affecting comfort level of pet when combed.

Besides, the pet groomer of the invention in embodiment 2 can also has the following features: the substance body also has a hollow front section which is placed outside of the air intake, and the hollow front section has a comb use opening; the combing assembly is consisted of a rotatable body and a plurality of groups of the comb teeth distributed in the axial direction of the rotatable body. The rotatable body is installed inside of the hollow front section, at least one group of the comb teeth extends outwards from the comb use opening to comb pet hair, and a rotation accepting assembly is set at one end of the rotatable body; the driving assembly is formed from a lever drive assembly which has a connecting rod driving unit and a lever connected with the connecting rod driving unit, and the connecting rod driving unit is meshed with the rotation accepting assembly.

Further, the pet groomer of the invention in embodiment 2 can also has the following features: the rotation accepting assembly is a ratchet wheel, the connecting rod driving unit has a driving pawl meshed with the ratchet wheel, and the ratchet wheel and the driving pawl constitute a rotation angle locating section which regulates the rotation angle of the rotatable body.

Further, the pet groomer of the invention in embodiment 2 can also has the following features: the pet groomer also includes a position limiting pawl, a 6-tooth position limiting wheel is also set at the other end of the rotatable body, the position limiting pawl and the 6-tooth position limiting wheel constitute a position limiting unit to ensure that the rotatable body rotates by the said rotation angle.

Further, the pet groomer of the invention in embodiment 2 can also has the following features: the ratchet wheel is a 6-tooth ratchet wheel, and when the lever is activated for one time, the rotatable body will be driven to rotate by 60°; the comb teeth are in six groups, the circular pitch between two neighbor groups is 60°, and the air intake is set at the place 60° rotated from the comb position.

Further, the pet groomer of the invention in embodiment 2 can also has the following features: the substance body also has an driving assembly container which is formed along and separated apart from the suction channel, the driving assembly container is adjacent to the hollow front section and used to contain the driving assembly, and the lever is exposed outside of the driving assembly container.

Further, the pet groomer of the invention in embodiment 2 can also has the following features: the hollow front section also has an air leakage opening which prevents excessive air force in the comb use opening from affecting comfort level of pet when combed.

Besides, the pet groomer of the invention in embodiment 3 can also has the following features: the substance body has two air intakes as the primary air intake and secondary air intake and a hollow front section which is placed outside of the two air intakes, and the hollow front section has a comb use opening; the combing assembly is consisted of a rotatable body and a plurality of groups of the comb teeth distributed in the axial direction of the rotatable body. The rotatable body is installed inside of the hollow front section, at least one group of the comb teeth extends outwards from the comb use opening to comb pet hair, and a rotation accepting assembly is set at one end of the rotatable body; the driving assembly is formed from a press-button drive assembly which has a connecting rod driving unit and a press-button which is connected with the connecting rod driving unit, and the connecting rod driving unit is meshed with the rotation accepting assembly. The comb teeth which have combed pet hair are firstly rotated to the primary air intake and then the secondary air intake in further activation.

Further, the pet groomer of the invention in embodiment 3 can also has the following features: the rotation accepting assembly is a ratchet wheel, the connecting rod driving unit has a driving pawl which is meshed with the ratchet wheel, and the ratchet wheel and the driving pawl constitute a rotation angle locating section which regulates the rotation angle of the rotatable body.

Further, the pet groomer of the invention in embodiment 3 can also has the following features: the pet groomer also includes a position limiting pawl, a 6-tooth position limiting wheel is set at the other end of the rotatable body, and the position limiting pawl and the 6-tooth position limiting wheel constitute a position limiting unit which ensures that the rotatable body rotates by the said rotation angle.

Further, the pet groomer of the invention in embodiment 3 can also has the following features: the ratchet wheel has 6 teeth, and when the press-button is pressed for one time, the rotatable body will be driven to rotate by 60°; the comb teeth are in six groups, the circular pitch between two neighbor groups is 60°, the primary air intake is set at the position 60° rotated from the comb position, and the secondary air intake is set at the position 120° rotated from the comb position.

Further, the pet groomer of the invention in embodiment 3 can also has the following features: the substance body also has an driving assembly container which is formed along and separated apart from the suction channel, the driving assembly container is adjacent to the hollow front section which is used to contain the driving assembly, and the press-button is exposed outside of the driving assembly container.

Further, the pet groomer of the invention in embodiment 3 can also has the following features: the substance body also has an air leakage opening which prevents excessive air force in the comb use opening from affecting comfort level of pet when combed.

Further, the pet groomer of the invention in embodiment 4 can also has the following features: the combing assembly is constituted of a rotatable body and a plurality of groups of the comb teeth distributed in the axial direction of the rotatable body. A ratchet wheel with more than one tooth space is set on one end of the rotatable body. The driving assembly is constituted of a cam assembly and a connecting rod driving assembly; the cam assembly has a cam coaxial with the rotatable body, a cam track which is integrated with the cam, and a driving pawl unit which is set on the cam; the driving pawl unit has a driving pawl which is meshed with the tooth space, and the connecting rod driving assembly is engaged with the cam track and drives the cam track to move, so the driving pawl can mesh with the tooth space.

Further, the pet groomer of the invention in embodiment 4 can also has the following features: the driving pawl unit has a driving pawl chamber which is integrated with the cam and used to contain the driving pawl, and has a spring with one end supported by the internal surface of the driving pawl chamber; the connecting rod driving assembly is engaged with the cam track to drive the cam track to move towards the direction opposite to the rotation direction of said rotatable body, so the driving pawl acts on the surface of the ratchet wheel under the elastic force of the spring, presses on the surface of the ratchet wheel flexibly in the radial direction of the cam, moves from one tooth space to next one, and meshes with the next one.

Further, the pet groomer of the invention in embodiment 4 can also has the following features: a spring retaining slot is set at one end of the driving pawl, the other end of the spring is in the spring retaining slot, and the driving pawl always presses on the surface of the ratchet wheel in the radial direction of the cam under the elastic force of the spring, and moves from one tooth space to next one.

Further, the pet groomer of the invention in embodiment 4 can also has the following features: the substance body also has a hollow front section which is placed outside of the air intake, the hollow front section has a comb use opening, the rotatable body is installed inside of the hollow front section, and the comb teeth which is rotated to the comb position extends outside of the comb use opening to comb the pet hair.

Further, the pet groomer of the invention in embodiment 4 can also has the following features: the cam assembly and the ratchet wheel constitute a rotation angle locating section to regulate the rotation angle of the rotatable body.

Further, the pet groomer of the invention in embodiment 4 can also has the following features: the ratchet wheel is a 6-tooth ratchet wheel, the rotation angle is 60° every time, and at least one air intake is set at the position integral multiples of 60° rotated from the comb position.

Further, the pet groomer of the invention in embodiment 4 can also has the following features: the comb teeth are in six groups, the circular pitch between two neighbor groups is 60°, every group of comb teeth has two rows of stagger arrangement, and the air intake is set in the position rotated by 120° from the comb position.

Further, the pet groomer of the invention in embodiment 4 can also has the following features: the comb teeth are in three groups, the circular pitch between two neighbor groups is 120°, the air intake is set at the position rotated by 120° from the comb position, when the first group of the comb teeth extends outside of the comb use opening, the rotatable body rotates for two times, and when the second group of the comb teeth is rotated to the comb position, the first group of the comb teeth is rotated to the position right against the air intake; when the rotatable body rotates for one time, the comb teeth is rotated to the position with 60° circular pitch from the comb position and therefore withdrawn in the hollow front section to protect the comb teeth.

Further, the pet groomer of the invention in embodiment 4 can also has the following features: a position limiting pawl is also included, a 6-tooth position limiting wheel is also set at the other end of the rotatable body, and the position limiting pawl and the position limiting wheel constitute a position limiting unit which ensures that the rotatable body rotates by the said rotation angle.

Further, the pet groomer of the invention in embodiment 4 can also has the following features: the substance body also has a flexible hose which is connected with the suction channel and an universal adaptor to be connected with the suction hose, and the universal adaptor regulates its inner diameter flexibly to ensure tight connection with the suction hose of different external diameters.

Further, the pet groomer of the invention in embodiment 4 can also has the following features: an operating and prompting unit is also included which sends corresponding information according to the fact whether the comb teeth are at the comb position or not and informs the user the status of the pet groomer; when no comb teeth are in the comb position, i.e. the pet groomer is under the status of protecting the comb teeth, the operating and prompting unit sends corresponding signals to inform the user it is protecting the comb teeth status, and then drives the connecting rod driving assembly, so a group of the comb teeth will extend outside of the comb use opening; when a group of comb teeth in the comb position is at the comb use opening, i.e. the pet groomer is under combing status, the operating and prompting unit sends corresponding signals to inform the user the combing status available to comb pet hair; if the comb teeth need to be withdrawn and hidden in the pet groomer, the connecting rod driving assembly should be driven.

Further, the pet groomer of the invention in embodiment 4 can also has the following features: the substance body also has an driving assembly container which is formed along and separated apart from the suction channel, the driving assembly container is adjacent to the hollow front section and used to contain the driving assembly. The connecting rod driving assembly has a press-button or a lever drive assembly which is exposed to the outside of the driving assembly container for selection.

Further, the pet groomer of the invention in embodiment 4 can also has the following features: the substance body also has at least one air leakage opening which prevents excessive air force in the comb use opening from affecting comfort level of pet when combed.

Further, according to the present invention, there is provided a vacuum cleaner, comprising:

a suction hose; and a pet groomer to be used in conjunction with the suction hose, wherein the pet groomer is described above.

The above and other objects and features of the present invention will become apparent from the following detailed description and the appended claims with reference to the accompanying drawings.

The pet groomer and related vacuum cleaner system with said groomer provided by present invention drives the combing assembly through the driving assembly, to move pet hair combed down from pet body to air intake position so as to be vacuumed away directly, avoiding the intermediate action of stripping off hair from comb teeth or similar actions, so no loose hair can fall off from pet body in grooming to pollute environment or to transmit allergen material.

BRIEF DESCRIPTION OF THE SEVERAL VIEWS OF THE DRAWINGS

The foregoing summary, as well as the following detailed description of the invention, will be better understood when read in conjunction with the appended drawings. For the purpose of illustrating the invention, there are shown in the drawings embodiments which are presently preferred. It should be understood, however, that the invention is not limited to the precise arrangements and instrumentalities shown.

In the drawings.

DETAILED DESCRIPTION OF THE INVENTION

Embodiments of the invention will be described in details herein below with reference to the drawings.

Embodiment 1

Figure 1:
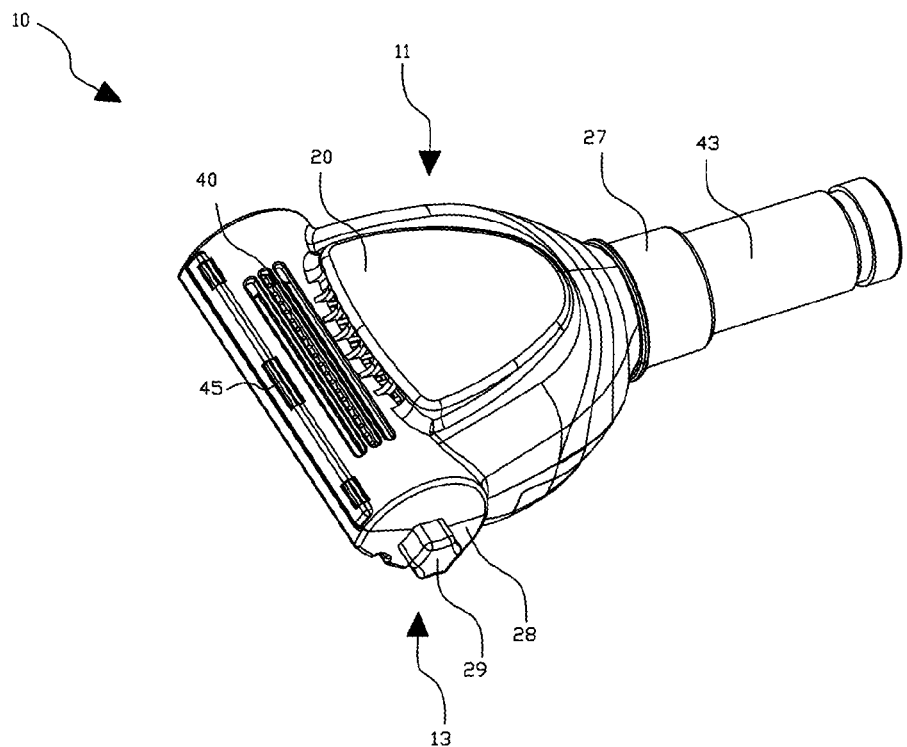
FIG. 1 is a side perspective view of the pet groomer in embodiment 1.
Figure 2:
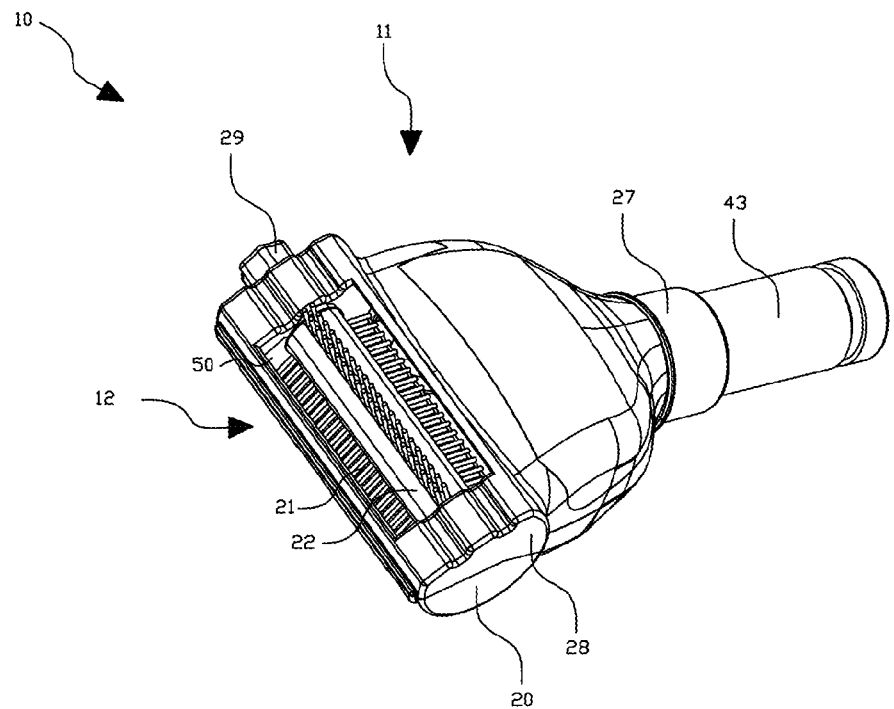
FIG. 2 is a perspective view of the pet groomer in embodiment 1, from bottom side.
Figure 3:
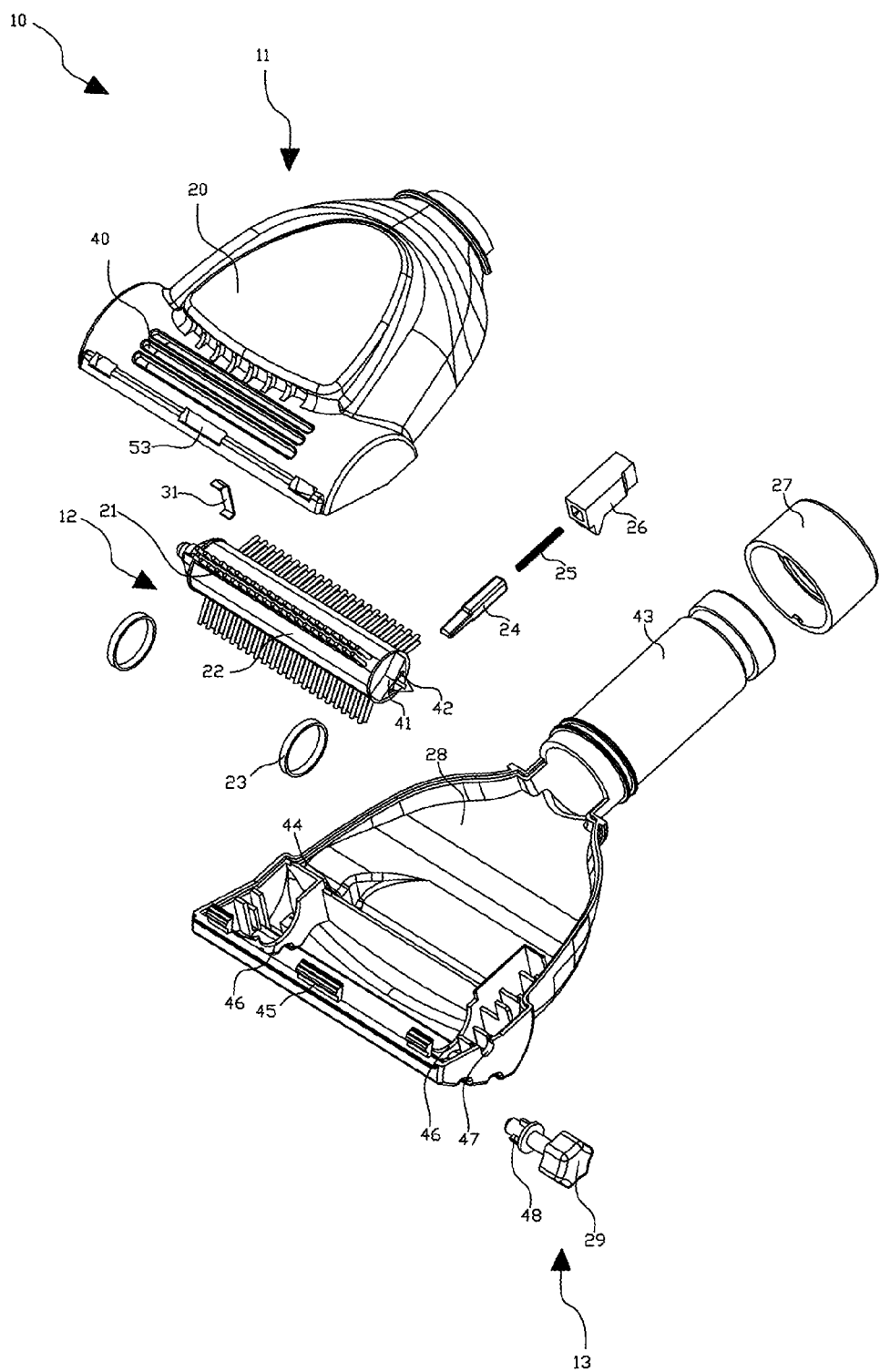
FIG. 3 is an exploded view of the pet groomer in embodiment 1.
Figure 4:
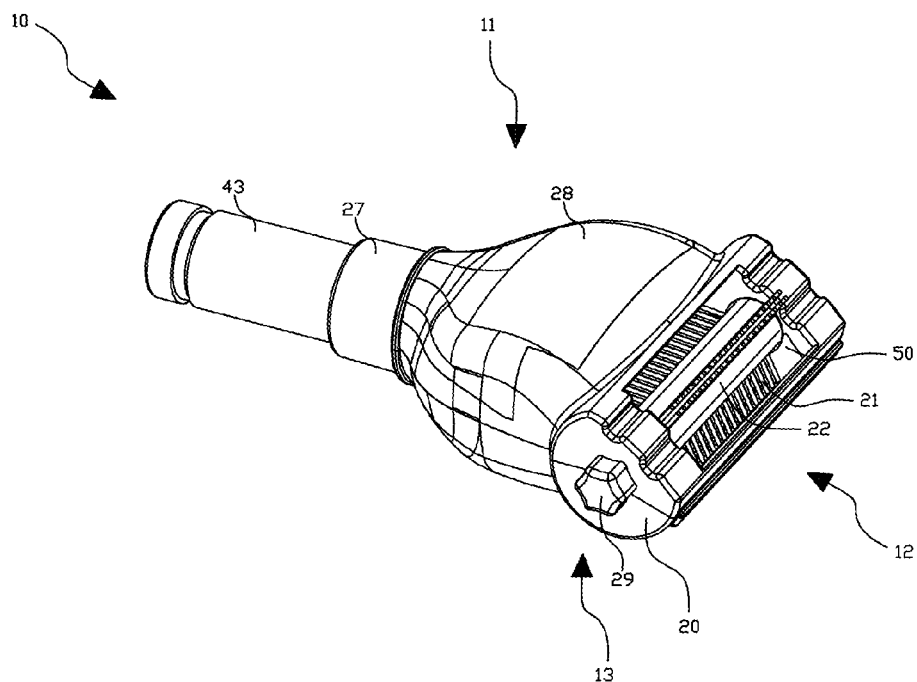
FIG. 4 is a perspective view of the pet groomer in embodiment 1, from bottom side.
Figure 6:
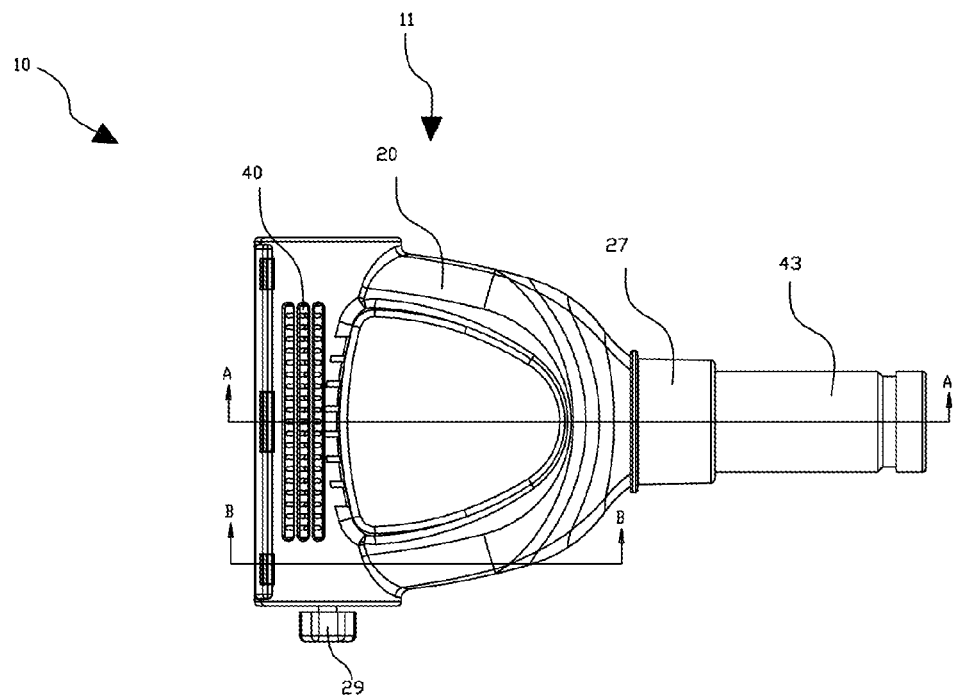
FIG. 6 is a top view of the pet groomer in embodiment 1.
Figure 7:
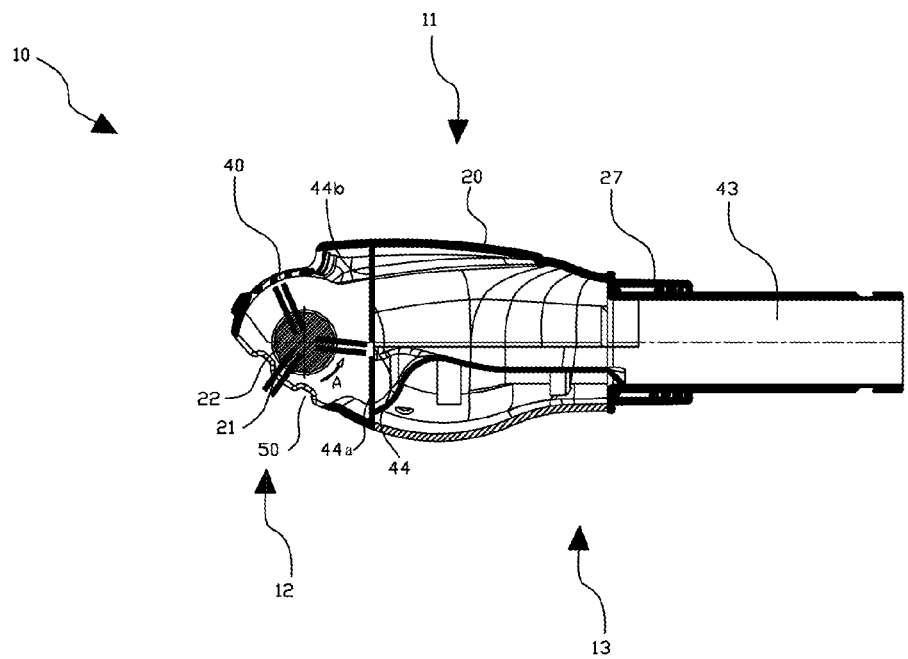
FIG. 7 is an A-A section view of FIG. 6.
Figure 8:
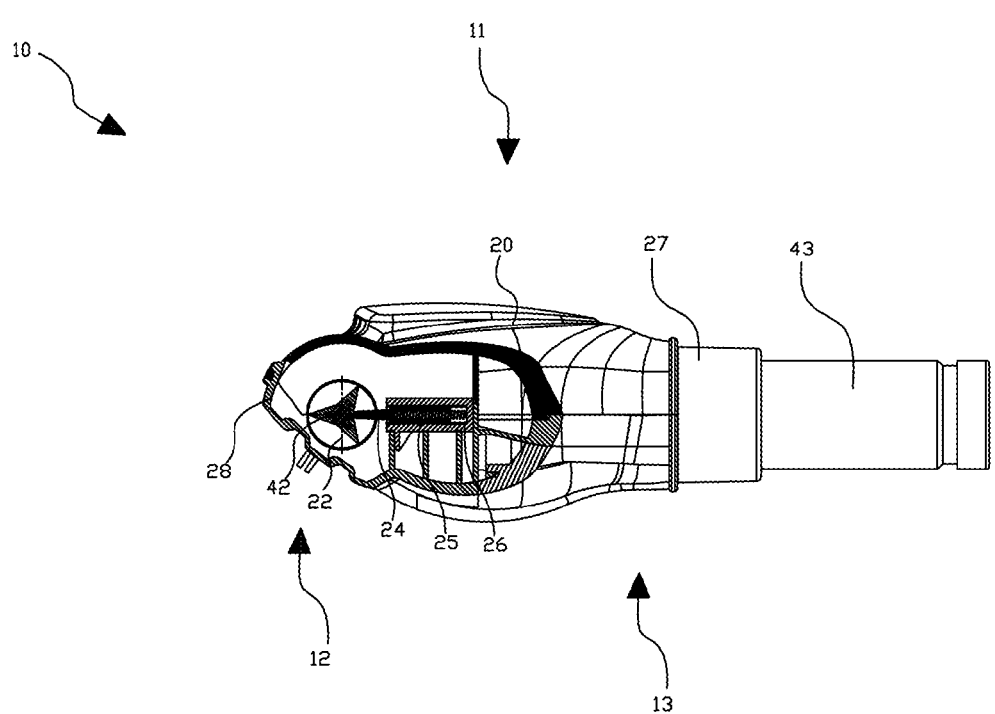
FIG. 8 is a B-B section view of FIG. 6.

FIG. 1 is a side perspective view of a pet groomer in embodiment 1; FIG. 2 is a perspective view of the pet groomer in embodiment 1 from bottom side; FIG. 3 is an exploded view of the pet groomer in embodiment 1; FIG. 4 is a perspective view of the pet groomer in embodiment 1 from bottom side; FIG. 6 is a top view of the pet groomer in embodiment 1; FIG. 7 is an A-A section view of FIG. 6 of the pet groomer in the embodiment; as shown by FIG. 1, FIG. 2, FIG. 3, FIG. 4, FIG. 6 and FIG. 7, the pet groomer 10 to be used together with the suction hose of a vacuum cleaner includes a substance body 11, a combing assembly 12 and a driving assembly 13.

The substance body 11 has an upper covering unit 20 and a lower covering unit 28. The lower covering unit 28 is constituted of the front section and rear section and a suction channel 43 is set at the rear section to be connected with the suction hose of vacuum cleaner. The external wall of suction channel 43 also serves as a handle for users to operate and use the pet groomer 10; half circles structure 46 and 47 are set at two side ends of the front section respectively and form circles together with the upper covering unit 20 for mounting the combing assembly 12. The front section also has a buckle 45, a slot 53 is set at the front section of the upper covering unit 20, and the slot 53 and the buckle 45 are fastened so that the upper covering unit 20 and the lower covering unit 28 are tightly combined together.

A clamp ring 27 is also set in the substance body 11 for combining the half circle structure at the rear end of the upper covering unit 20 with the corresponding half circle at the middle of the lower covering unit 28 to clamp the upper covering unit 20 with the lower covering unit 28 tightly. The clamp ring is detachable. When it is necessary to replace the combing assembly or clean the parts between the upper covering unit 20 and lower covering unit 28, demount the clamp ring 27 to demount the upper covering unit 20 and the lower covering unit 28, and obviously the combing assembly mounted between the upper covering unit 20 and the lower covering unit 28 is replaceable.

After the upper covering unit 20 is combined with the lower covering unit 28, the baffle 44b in the upper covering unit 20 forms an air intake 44 (See FIG. 7) to transmit air into the suction channel 43 together with the baffle 44a in the lower covering unit 28. The best preference for the length of air intake 44 is to be longer than the contour length of any group of comb teeth 21 distributed on rotatable body 22. A hollow front section is placed outside of the air intake 44, and a comb use opening 50 and an air leakage opening 40 are set in the hollow front section.

Figure 5:
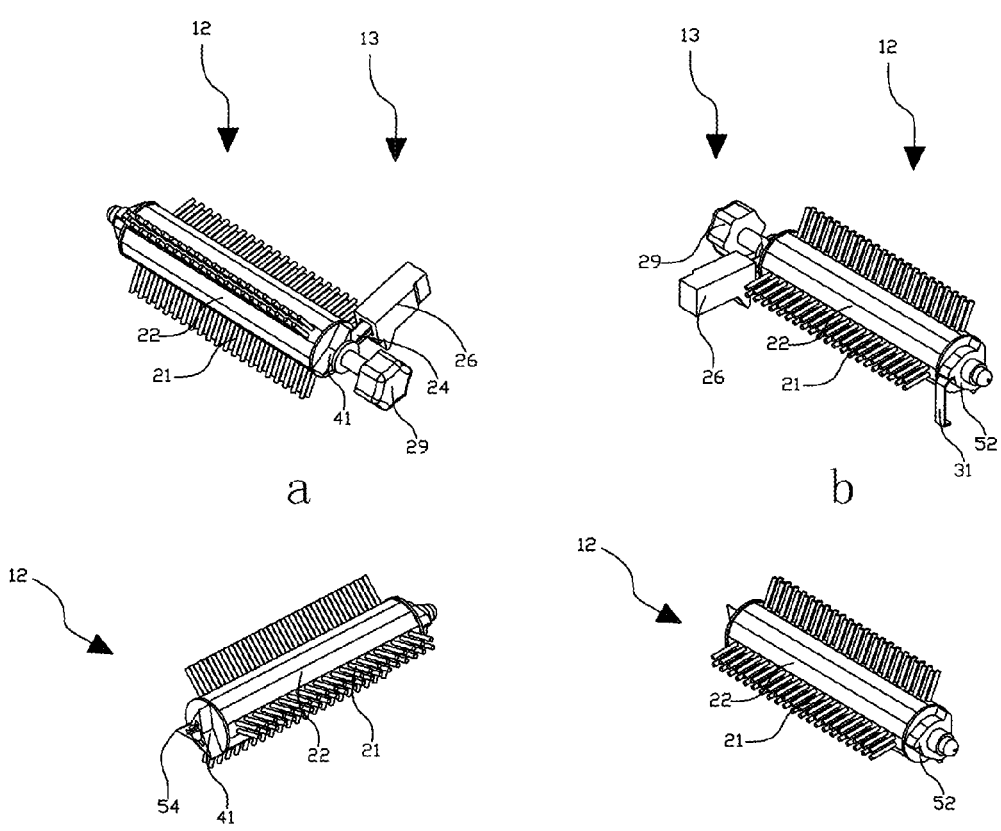
FIG. 5 is a structural illustration of combing assembly of the pet groomer in embodiment

FIG. 5 is a structural illustration of the combing assembly of the pet groomer in embodiment 1, of which views a, b, c and d are structural illustrations of the combing assembly in different directions. As shown by FIG. 5, the combing assembly 12 is comprised of a rotatable body 22 and three groups of comb teeth 21 arranged in axial direction on the rotatable body 22. Every group includes two rows of comb teeth 21, and the interval of two adjacent groups of comb teeth 21 is 120°, and one group of comb teeth 21 extends outside of the comb use opening 50 to comb pet hair. The air intake 44 is set at the position rotated by 120° from comb position along direction A in FIG. 7.

As the best preference for the arrangement of comb teeth 21 on rotatable body 22, for any group of comb teeth 21, when they are located opposite to the air intake 44, their orthogonal projection against air intake 44 should not fall beyond the contour of air intake 44. The recommended length of comb tooth 21 is equivalent to the thickness of pet hair to be combed Felts 23 are mounted at two ends of the rotatable body 22, so the rotatable body 22 is mounted in the circle 46 between the upper covering unit 20 and lower covering unit 28 to make sure that the rotatable body 22 rotates around the axis and the rotatable body 22 is tightly combined with the upper covering unit 20 and lower covering unit 28 to avoid furs and other sundries from flying into two side ends. Obviously the rotatable body 22 is inside of the hollow front section.

A driven groove 42 (i.e. rotation accepting assembly) and a 6-tooth positioning block 41 around the driven groove 42 for regulating the rotation angle of the rotatable body 22 as 120° are set at one end of the rotatable body 22.

The 6-tooth positioning block 41 and the positioning gear unit constitute a positioning unit, and the positioning gear unit is comprised of a positioning gear 24 to mesh with the 6-tooth positioning block 41, a guide holder 26 fixed between the upper covering unit 20 and the lower covering unit 28, and a spring 25 to connect the two above. The end of the positioning gear 24 connected with the spring 25 is inserted into the guide holder 26 so that the positioning gear is able to flexibly extend in the guide holder 26 under the action of the spring 25. When the rotatable body 22 rotates by 120°, the positioning gear 24 is meshed with the 6-tooth positioning block 41 to make sure that the rotation angle of the rotatable body must be integral multiples of 120°.

The pet groomer 10 also has a position limiting plate 31, a ratchet wheel 52 meshed with the position limiting plate 31 is set at the other end of the rotatable body 22, the ratchet wheel 52 and the position limiting plate 31 constitute a position limiting unit, so that the ratchet wheel 52 and the position limiting plate 31 are meshed every time after the rotatable body 22 rotates to prevent the rotatable body 22 from rotating reversely in combing.

The driving unit 13 is a knob with a rib 48, rib 48 passes through the side end of the hollow front section and meshes with the driven groove 42, so when the knob 29 is turned, the moment is transferred to the rotatable body 22 from rib 48 to make the comb teeth 21 rotate around the axis. Comb teeth 21 can fix in the place right against air intake 44 and ensure every piece of comb teeth 21 in this group points to air intake 44 and falls inside the air stream into the air intake 44.

When the pet groomer is used to comb pet hair, firstly choose the rotatable body 22 with corresponding length of comb teeth 21 to mount in the hollow front section according to different pet hair length, so to avoid scratch on pet skin owing to unsuitable lengths of comb teeth in the combing process. Then connect the pet groomer with a vacuum cleaner, and turn on the vacuum cleaner. Then the comb use opening 50 and the air leakage opening 40 transmit airflows to the air intake 44 at the same time, and the airflow enters into vacuum cleaner through the suction channel 43. Then user holds the external wall of the suction channel 43 as handle to comb pets. In the combing process, the pet's body blocks the comb use opening 50, the airflow from the air leakage opening 40 to the air intake 44 reduces the suction force at the comb use opening 50 and effectively avoiding excessive suction that affects comfort of pets. After a certain amount of hair is accumulated on the comb teeth, turn the knob 29 to make a new group of comb teeth 21 to the comb position, so user could continue to comb pets with the new group of comb teeth. The two rows of comb teeth 21 just combed hair are rotated by 120° along direction A (See FIG. 7), which is just fixed at the position opposite to the air intake 44, to make sure that every piece of comb teeth in the group of comb teeth 21 points to the middle of the air intake 44, and sufficient suction force along the comb teeth extending direction will vacuum hair from the comb teeth 21 into the air intake 44, no need external force to strip hair off comb teeth in advance. Because suction force is on the comb position in the whole process, pet hair will not drop down in the whole process.

The best total sectional area of the air leakage opening 40 is 1.2 times of total sectional area of the air intake 44, and the best total sectional area of the air intake is equivalent to the sectional area of the suction hose of the vacuum cleaner. The best airflow at the air intake is equivalent to the actual airflow of the suction hose of a vacuum cleaner, i.e. no air leaking device is between the air intake and the suction hose of the vacuum cleaner.

Function and Effects of Embodiment 1

In summary, the pet groomer 10 in the embodiment has the knob 29 to drive the rotatable body 22, so pet hair combed are transferred to the air intake 44 and vacuumed into cleaner. No pet hair drops down in the combing process, thus not causing environmental pollution and avoiding allergen spreading. Besides, the substance body is detachable and easy for internal structure cleaning; the rotatable body is replaceable, so user can choose suitable comb teeth length for his pet groomer according to different pet hair to improve the comfort level of pets in the combing process and avoid hurting pets, since pet hair is transferred to air intake through knob rotation, even hair wound in comb teeth can also be vacuumed into the air intake along the comb teeth extending direction and they will not scatter, and moreover, intermediate actions like stripping off hair from comb teeth or similar are saved. As a result the pet groomer 10 has the following features: simple structure, convenient use, labor saving, not tiring for use and no threaten to user's health.

The clamp ring 27 in the embodiment can screw back and forth to mesh with the steps of the upper covering unit 20 and the lower covering unit 28 to ensure tight locking between the upper covering unit 20 and the lower covering unit 28, clamp ring 27 can also lock with the upper covering unit 20 and the lower covering unit 28 through locking slot.

The comb teeth 21 in the embodiment are in three groups, it can also be in other integral group(s), and every group may has one or more rows; the quantity of the comb teeth 21 in every row is also subject to requirements, such as 20 pieces, 30 pieces, 40 pieces, 50 pieces and 60 pieces; the diameter of the comb teeth 21 is also subject to requirements, for example, Φ 0.3, Φ 0.5, Φ 0.6, Φ 0.8, Φ 1.0, Φ 1.2, Φ 1.5, etc. The material of the comb teeth 21 is subject to requirements like stainless steel 304, stainless steel 201, 45# plated steel, plastic PP, etc.; the top surface shape of the comb teeth 21 may be flat or others like ball-shape.

The comb teeth 21 in the embodiment may be directly fixed in the rotatable body 22 or firstly connected with other carriers and then fixed in the rotatable body 22. For example, the comb teeth 21 may be firstly connected with a fixing base and then mounted on rotatable body 22. The comb teeth 21 may have a movable structure for convenient of repairing and replacement.

Embodiment 2

Figure 9:
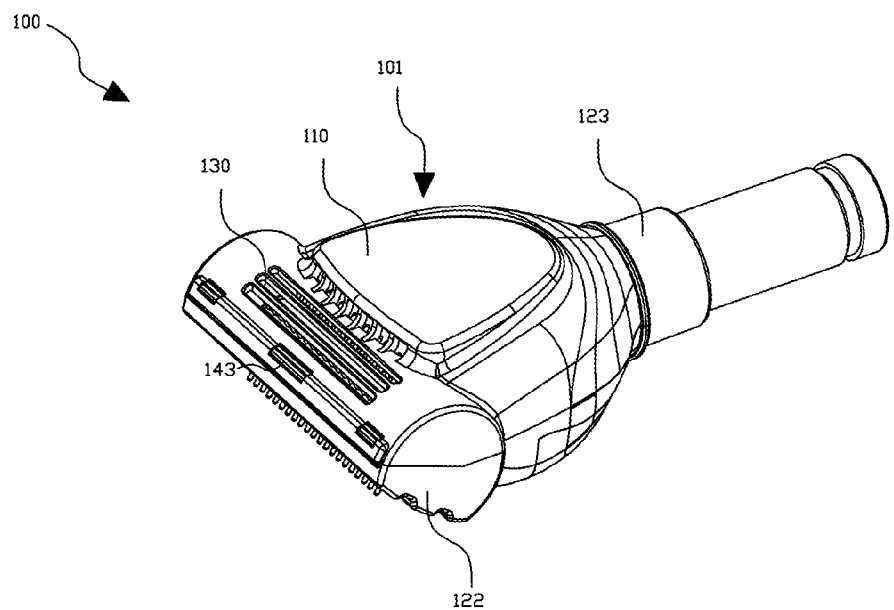
FIG. 9 is a side perspective view of the pet groomer in embodiment 2.
Figure 10:
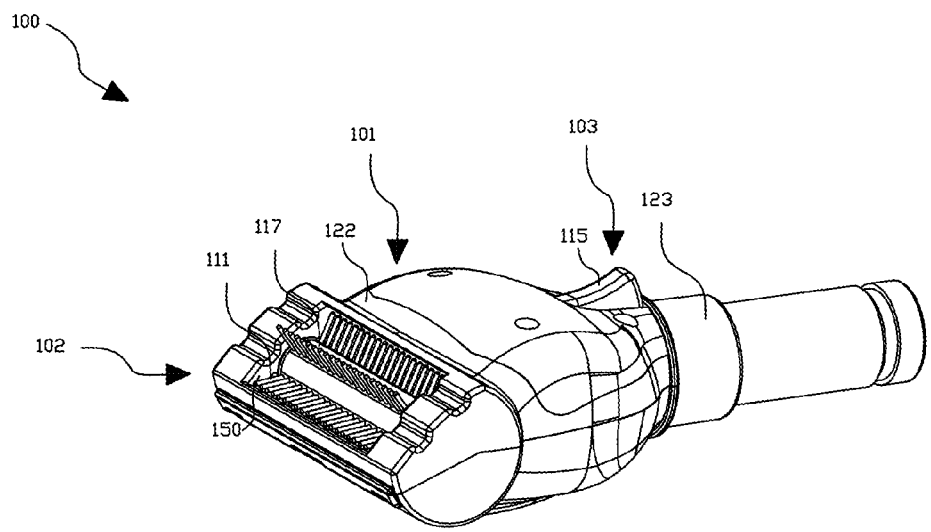
FIG. 10 is a perspective view of the pet groomer in embodiment 2, from bottom side.
Figure 11:
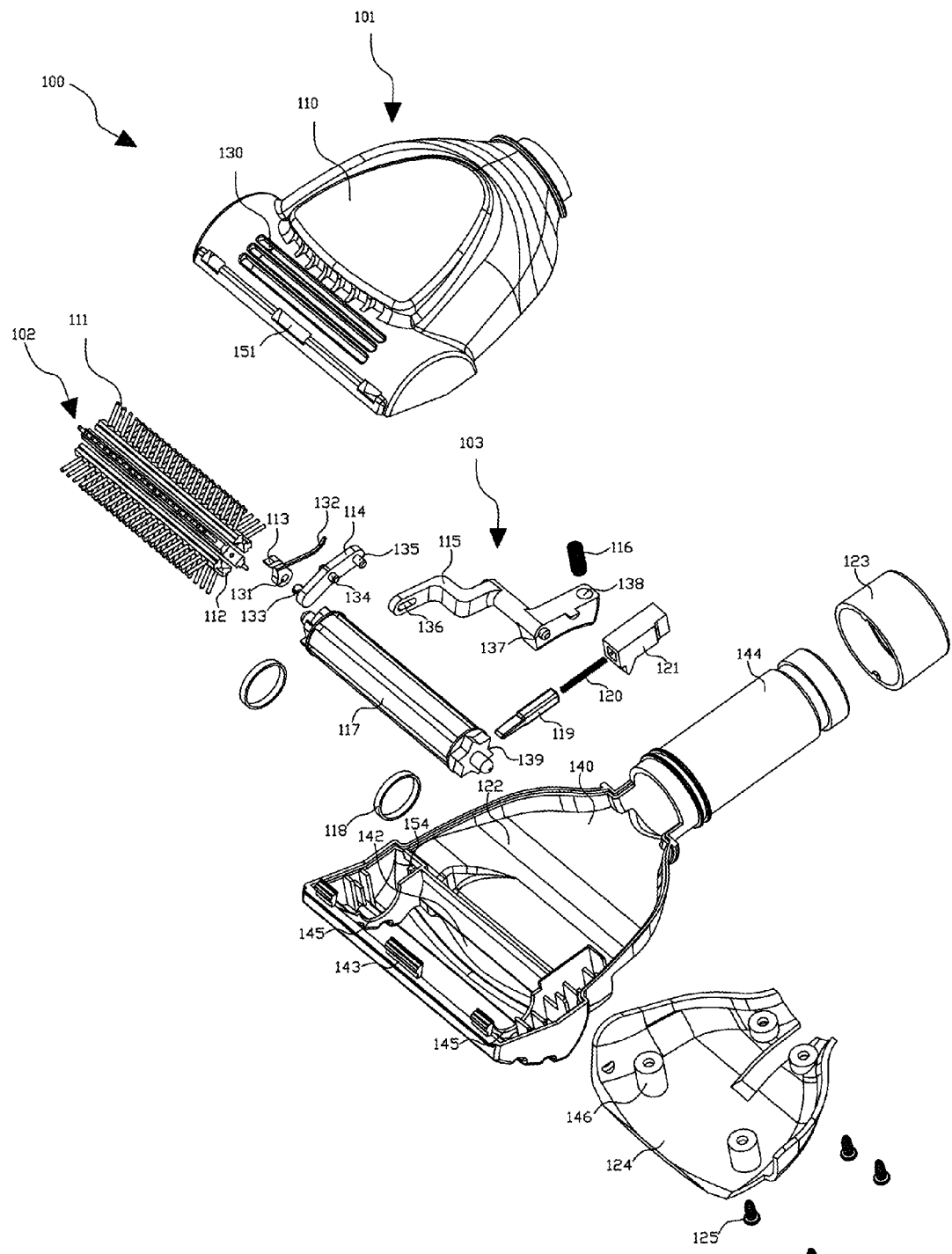
FIG. 11 is an exploded view of the pet groomer in embodiment 2.
Figure 12:
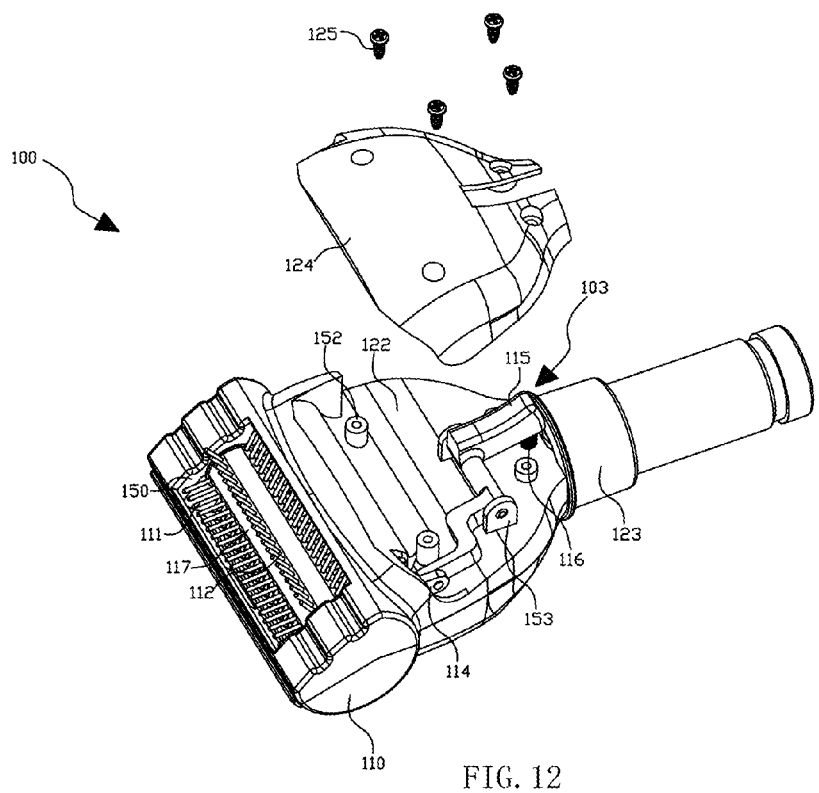
FIG. 12 is a bottom exploded view of the pet groomer in embodiment 2.
Figure 14:
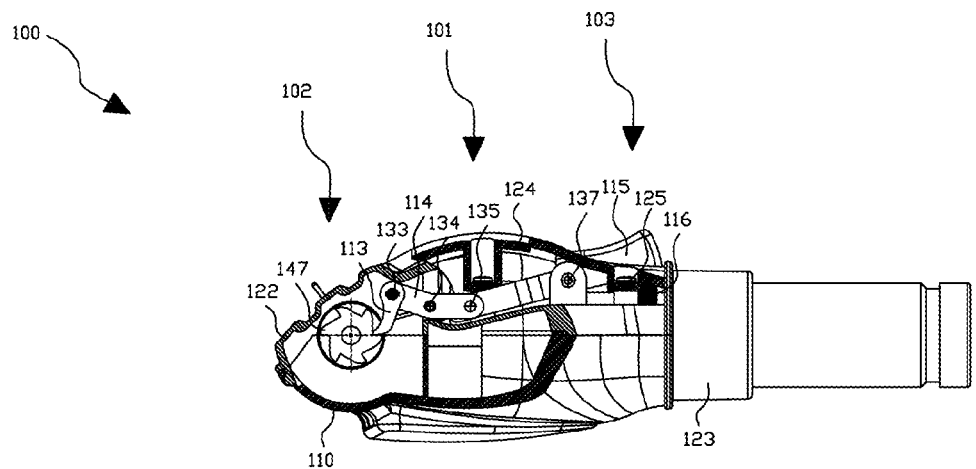
FIG. 14 is an inverted side section view of the pet groomer in embodiment 2.
Figure 15:
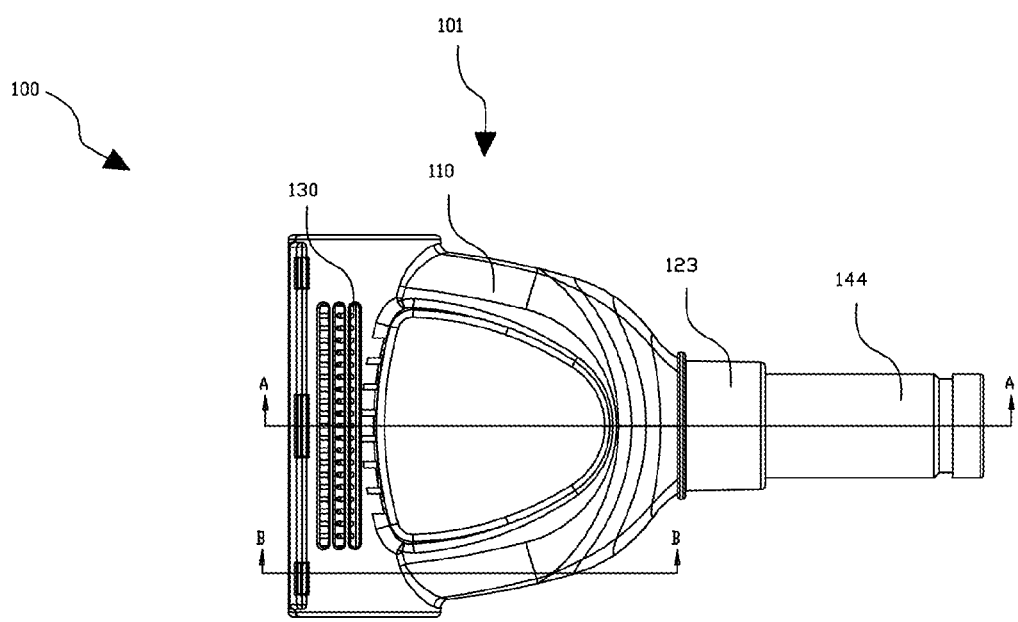
FIG. 15 is a top view of the pet groomer in embodiment 2.
Figure 16:
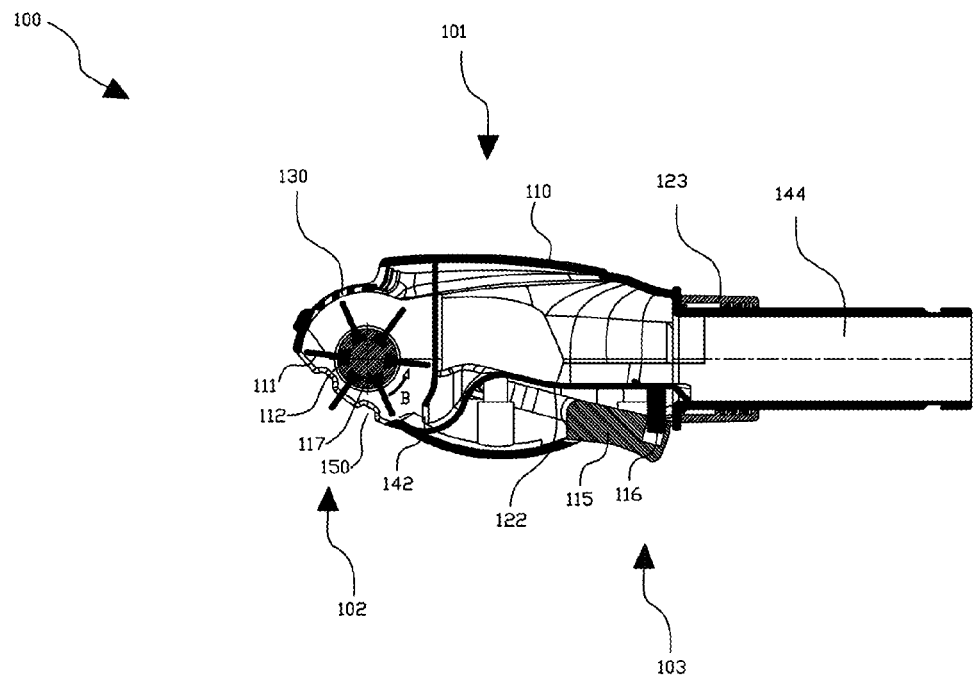
FIG. 16 is an A-A section view of FIG. 15.
Figure 17:
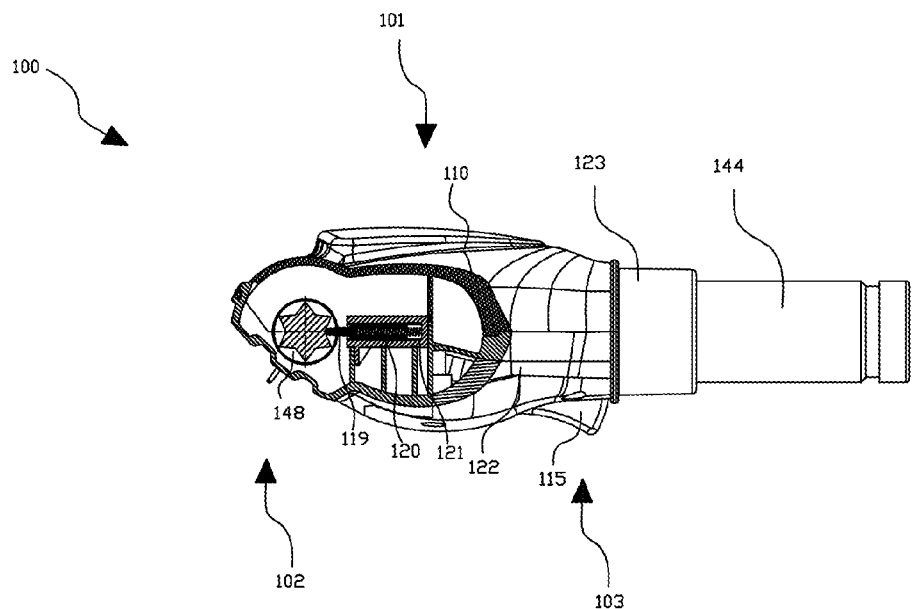
FIG. 17 is a B-B section view of FIG. 15.

FIG. 9 is a side perspective view of the pet groomer in embodiment 2; FIG. 10 is a bottom perspective view of the pet groomer in embodiment 2; FIG. 11 is an exploded view of the pet groomer in embodiment 2; FIG. 12 is a bottom exploded view of the pet groomer in embodiment 2; FIG. 14 is an inverted side section view of the pet groomer in embodiment 2; FIG. 15 is a top view of the pet groomer in embodiment 2; FIG. 16 is an A-A section view of FIG. 15; FIG. 17 is a B-B section view of FIG. 15. As shown by FIG. 9, FIG. 10, FIG. 11, FIG. 12, FIG. 14, FIG. 15, FIG. 16 and FIG. 17, a pet groomer 100 to be used together with the suction hose of vacuum cleaner includes a substance body 101, a combing assembly 102 and a driving assembly 103.

The substance body 101 has an upper covering unit 110 and a lower covering unit 122. The lower covering unit 122 is comprised of a front section and a rear section, a suction channel 144 is set at the rear end to be connected with the suction hose of vacuum cleaner, and the external wall of the suction channel 144 also serves as a handle for users to operate and use the pet groomer 100; half circles 145 are set at two side ends of the front section respectively and form circles together with the upper covering unit 100 for mounting the combing assembly 102. The front section also has a buckle 143, a slot 151 is set at the front section of the upper covering unit 110, and the slot 151 and the buckle 143 can be fastened together to lock tightly the upper covering unit 110 and the lower covering unit 122.

A clamp ring 123 also set in the substance body 101 for combining the half circle structure which is at the rear end of the upper covering unit 110 with the corresponding half circle which is at the middle of the lower covering unit 122 and clamp the upper covering unit 110 with the lower covering unit 122 tightly. The clamp ring 123 is detachable. When it is necessary to replace the combing assembly 102 or clean the parts between the upper covering unit 110 and lower covering unit 122, demount the clamp ring 123 to demount the upper covering unit 110 and the lower covering unit 122, and obviously the combing assembly mounted between the upper covering unit 110 and the lower covering unit 122 is replaceable.

After the upper covering unit 110 is combined with the lower covering unit 122, the baffle in the upper covering unit 110 is tightly combined with the corresponding baffle in the lower covering unit 122. An air transmission channel is set in the lower covering unit 122 and connected with the suction channel 144. An air intake 142 is set accordingly in the front of the air transmission channel to transmit air into the air transmission channel. A hollow front section is placed outside of the air intake 142, and a comb use opening 150 and an air leakage opening 130 are set in the hollow front section. The best preference of the length of air intake 142 is to be longer than the contour length of any group of comb teeth 111 distributed on rotatable body 117.

A back plate 124 is set at the bottom of the lower cover to cover the driving assembly, a screw hole 146 is set at the back plate 124, a screw boss 152 corresponding to the screw hole 146 is set on the lower covering unit 122, the back plate 124 is reliably connected with the lower covering unit 122 through the screw 125, and the area between the back plate 124 and the lower cover of the air transmission channel (i.e. driving assembly container)-stores driving assembly 103.

The driving assembly 103 is comprised of a lever drive assembly, which is consisted of a driving pawl 113, a connecting rod 114, and the lever 115 which is exposed outside of the driving assembly container and near the suction channel 144. It is convenient for activating when user grasps the external wall of the suction channel 144 as handle. The connecting rod 114 has a positioning cylinder 134, a motion transmission cylinder 135 connected with the lever 115, and a motion transmission cylinder 133 connected with the driving pawl 113. The positioning cylinder 134 is fixed in the positioning block 154 of the lower covering unit 122. The motion transmission cylinder 133 activates the driving pawl 113. The driving pawl 113 has a round hole 131 and an elastic reset assembly 132, the round hole 131 is connected with the motion transmission cylinder 133, and the elastic reset assembly 132 is pressed on the connecting rod 114 so the driving pawl 113 interacts with the combing assembly 102 continuously. The lever 115 has a rotary positioning cylinder 137, slotted hole 136 and a supporter groove 138 of spring 116, the rotary positioning cylinder 137 is fixed in the tab 153 of the lower covering unit 122, and the slotted hole 136 is connected with the cylinder 135 of the connecting rod 114 to transfer the moment. The spring supporter groove 138 contains spring 116, so the lever 115 can reset under the action of spring 116 after activated.

Figure 13:
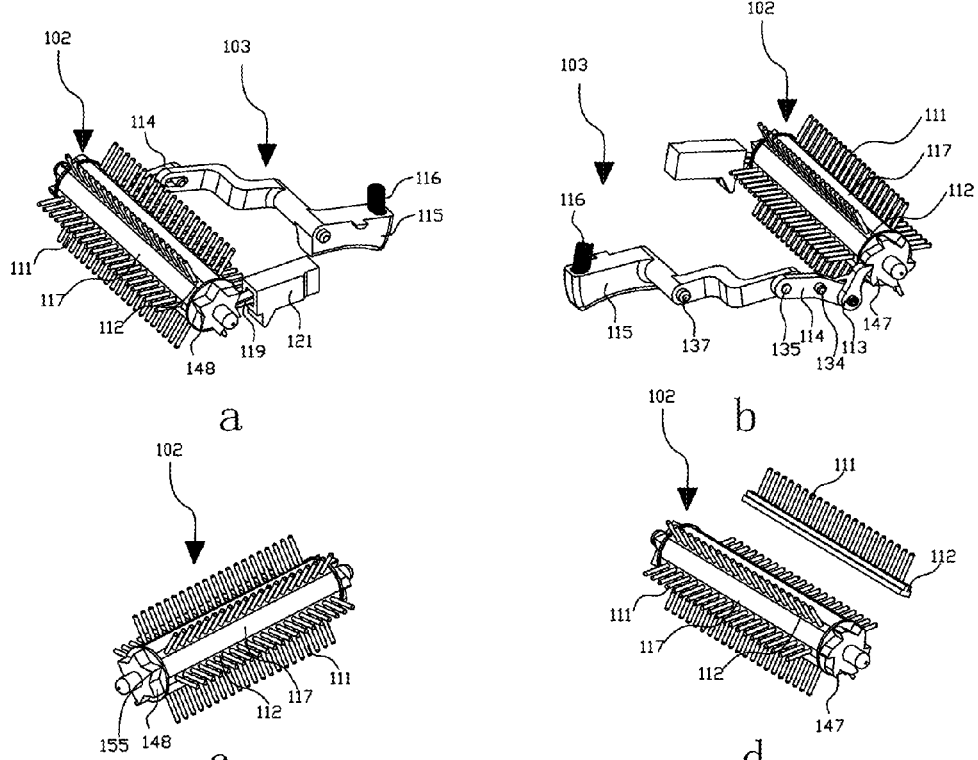
FIG. 13 is a structural illustration of the combing assembly of the pet groomer in embodiment 2.

FIG. 13 is a structural illustration of the combing assembly in embodiment 2; Fig. a\b\c\d are structural illustrations of the combing assembly in different directions. As shown by FIG. 13, the combing assembly 102 is comprised of a rotatable body 117, a comb teeth base plate 112 and six groups of replaceable comb teeth 111 arranged in the axial direction of the rotatable body, the interval between two neighbor groups of the comb teeth 111 is 60°, and a group of comb teeth 111 has one row. The air intake 142 is set at the position rotates by 60° from the comb position along direction B in FIG. 16.

Felts 118 are mounted at two ends of the rotatable body 117 so the rotatable body 117 is mounted in the circle 145 between the upper covering unit 110 and the lower covering unit 122 to ensure the rotatable body 117 rotates around the axis and there is no gap between the rotatable body 117, the upper covering unit 110 and the lower covering unit 122, so that pet hair are prevented from flying into two sides. Obviously the rotatable body 117 is mounted inside of the hollow front section. One group of comb teeth 111 extends outside of the opening 150 to comb.

A 6-tooth ratchet wheel 147 which meshes with the driving pawl 113 is set at one end of the rotatable body 117, and the 6-tooth ratchet wheel 147 and the driving pawl 113 constitute into a rotation angle locating section to regulate that the rotation angle of the rotatable body 117 is 60° in every rotation, and prevent rotatable body 117 from reversing in use.

The pet groomer 100 also has a position limiting gear 119, and a 6-tooth position limiting wheel 139 is set at the other end of the rotatable body 117. The 6-tooth position limiting wheel 139 and the above mentioned position limiting gear 119, the guide holder 121 fixed between the upper covering unit 110 and the lower covering unit 122 and a spring 120 connect the two parts constitute into a position limiting unit. The end of the position limiting gear 119 connected with the spring 120 is inserted into the guide holder 121, so the position limiting gear 119 flexibly extends in the guide holder 121 under the action of the spring 120. When the rotatable body 117 rotates by 60°, the position limiting gear 119 is meshed with the 6-tooth position limiting wheel 139 to prevent rotatable body 117 from rotating reversely.

When the pet groomer is used to comb, firstly choose the rotatable body 117 with proper length of comb teeth 111 to mount in the hollow front section according to pet hair length to avoid scratching pet skin in combing, or to replace comb teeth 111 in the rotatable body 117 with those of best lengths.

Then connect the pet groomer with a vacuum cleaner, and turn on vacuum cleaner. Then the comb use opening 150 and the air leakage opening 130 transmit airflows to the air intake 142 at the same time, and the airflow enters into vacuum cleaner through the suction channel 144. Then the user holds the external wall of the suction channel 144 as the handle to comb pets. In the combing process, the pet's body blocks the comb use opening 150, the airflow from the air leakage opening 130 to the air intake 142 helps reduce the suction force at the comb use opening 150 to avoid excessive suction that affects comfort of pets. After certain amounts of pet hair accumulated on the comb teeth, activate the lever 115 outside of the lower covering unit 122, the connecting rod 114 drives the driving pawl 113 and the driving pawl 113 pushes the 6-tooth ratchet wheel 147 and therefore drives the rotatable body 117 to rotate by 60°. Then a new group of comb teeth 111 is rotated to the comb position, so the user could continue to comb pets with this new group of comb teeth. The comb teeth 111 above mentioned with pet hair are rotated and fixed at the position opposite to the air intake 142, to make sure sufficient suction airflow along the comb teeth extending direction vacuums hair from the comb teeth 111 into the air intake 142, no need to strip off hair in the comb teeth 111 with external force. Because suction acts in the comb position in the whole process, no pet hair will drop down in the whole process.

Besides, if one or more pieces of comb teeth 111 are damaged, new comb teeth can be used to replace.

Function and Effects of Embodiment 2

The pet groomer 100 provided by the embodiment has a lever drive assembly to drive the rotatable body 117 and move pet hair to the front of the air intake 142, so airflows flowing towards air intake 142 take hair from comb teeth to vacuum cleaner in the comb teeth extending direction, and combed hair does not need to be stripped off from comb teeth with external force in advance, no pet hair would drop down in the combing process, thus not causing environmental pollution and avoiding allergen spreading. Besides, the substance body is detachable and easy for internal structure cleaning; the rotatable body is replaceable, so user can choose proper comb length according to different pet hair. Every group of comb teeth is replaceable, so when one or more pieces of comb teeth 111 are damaged, new comb teeth may replace damaged ones, thus being environment-protection. Plus, choosing comb with proper teeth length according to different pet hair can improve the comfort level of pets in the combing process and avoid hurting pets at the same time. Pet hair are moved to air intake and vacuumed away once after the lever is activated. As a result the pet groomer 100 has the following features: simple structure, convenient use, labor saving, not tiring to use and no harm to user's health.

The clamp ring 123 can screw back and forth to mesh with the steps of the upper covering unit 110 and the lower covering unit 122 to make both covering units lock together tightly; the upper covering unit 110 and the lower covering unit 122 could also be connected together through a locking groove.

The comb teeth 111 in the embodiment are in six groups, can also be in other integral group(s), and every group may has one or more rows; the quantity of the comb teeth 111 in every row is also subject to requirements, such as 20 pieces, 30 pieces, 40 pieces, 50 pieces and 60 pieces; the diameter of the comb teeth 111 is also subject to requirements, for example, Φ 0.3, Φ 0.5, Φ 0.6, Φ 0.8, Φ 1.0, Φ 1.2, Φ 1.5, etc. The material of the comb teeth 111 is also subject to requirements like stainless steel 304, stainless steel 201, 45# plated steel, plastic PP, etc.; the top surface shape of the comb teeth 111 may be flat or others like ball-shape.

The comb teeth 111 are firstly connected with the base plate 112, then fixes the base plate 112 into the rotatable body 117. The base plate 112 of the comb teeth and the rotatable body 117 may also be connected with a pressing plate, or by other methods. Of course the comb teeth 111 may also be mounted on other carriers and then on the rotatable body. The comb teeth 111 may be a movable structure convenient for repair and replacement, or permanently fixed in the rotatable body 112.

Besides, the lower covering unit 122 and the bottom back plate 124 may be connected in others ways, such as through a buckle or by ultrasonic welding.

Embodiment 3

Figure 18:
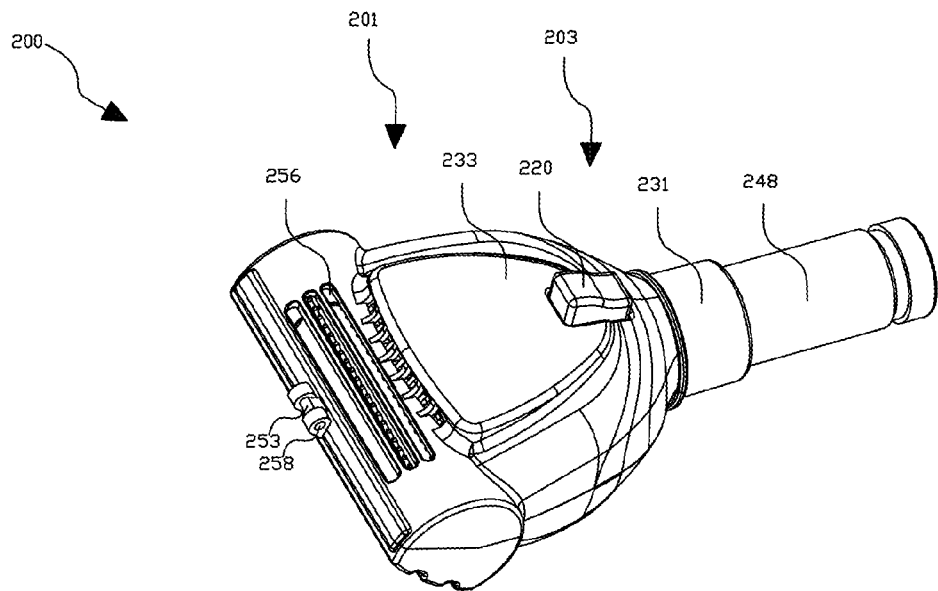
FIG. 18 is a side perspective view of the pet groomer in embodiment 3.
Figure 19:
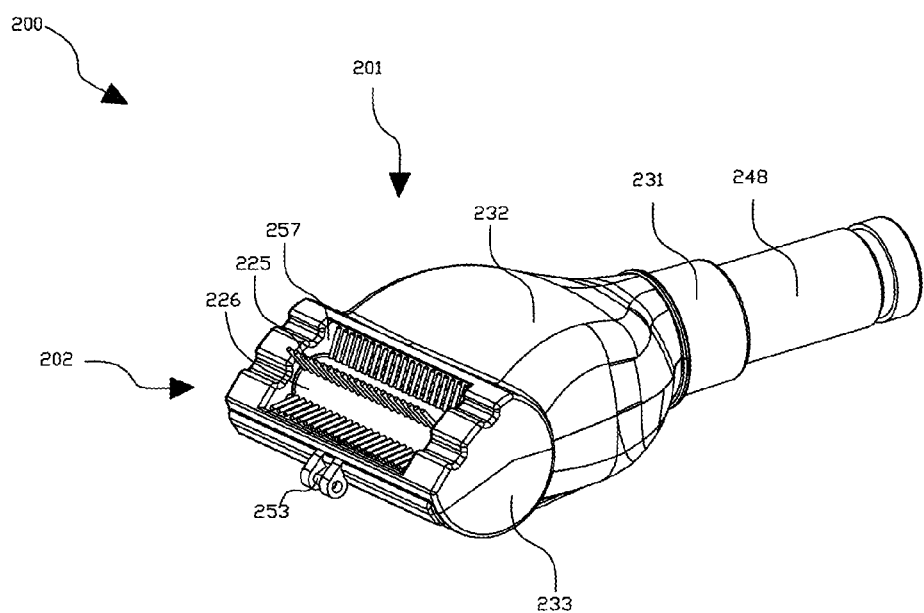
FIG. 19 is a perspective view of the pet groomer in embodiment 3, from bottom side.
Figure 20:
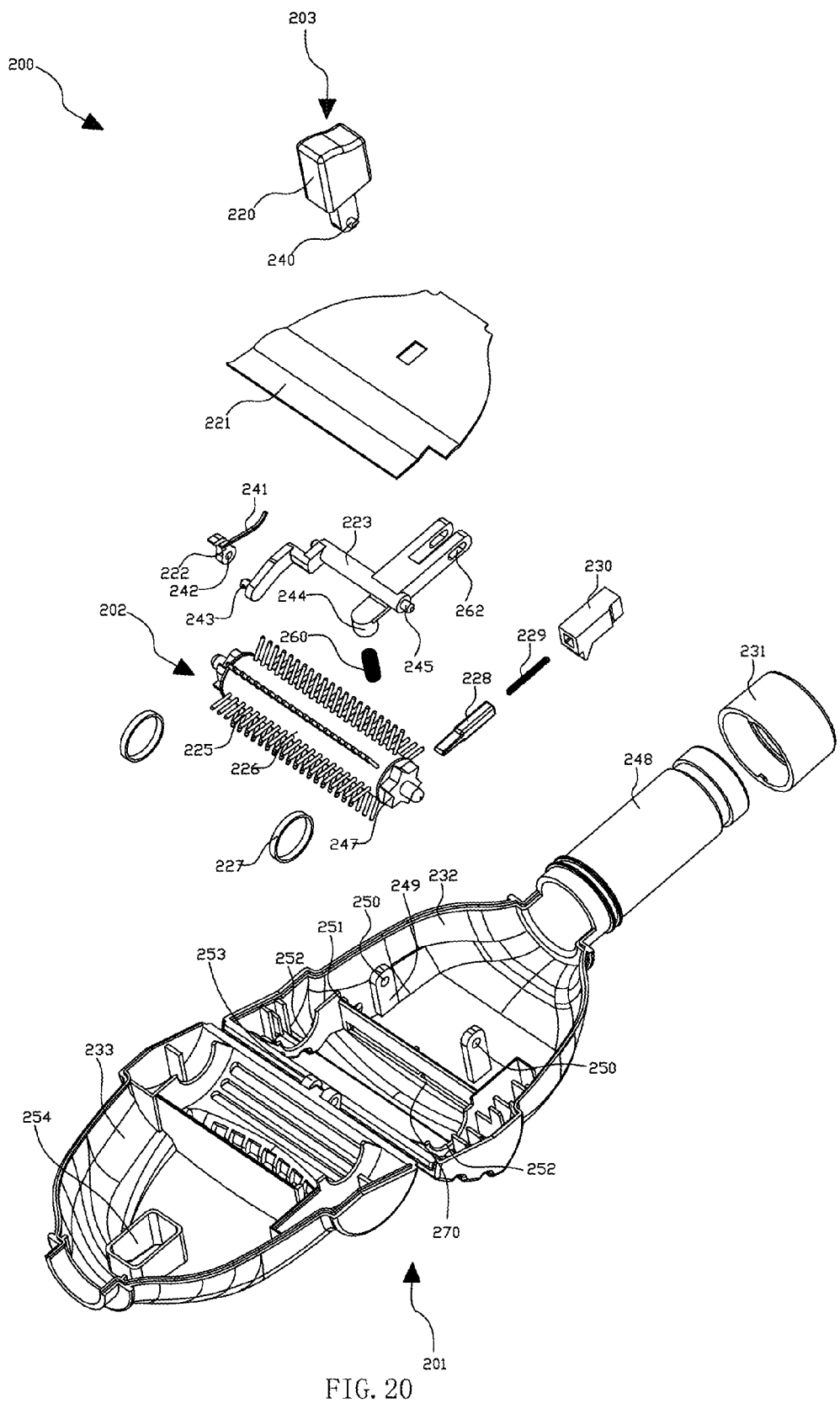
FIG. 20 is an exploded view of the pet groomer in embodiment 3.
Figure 21:
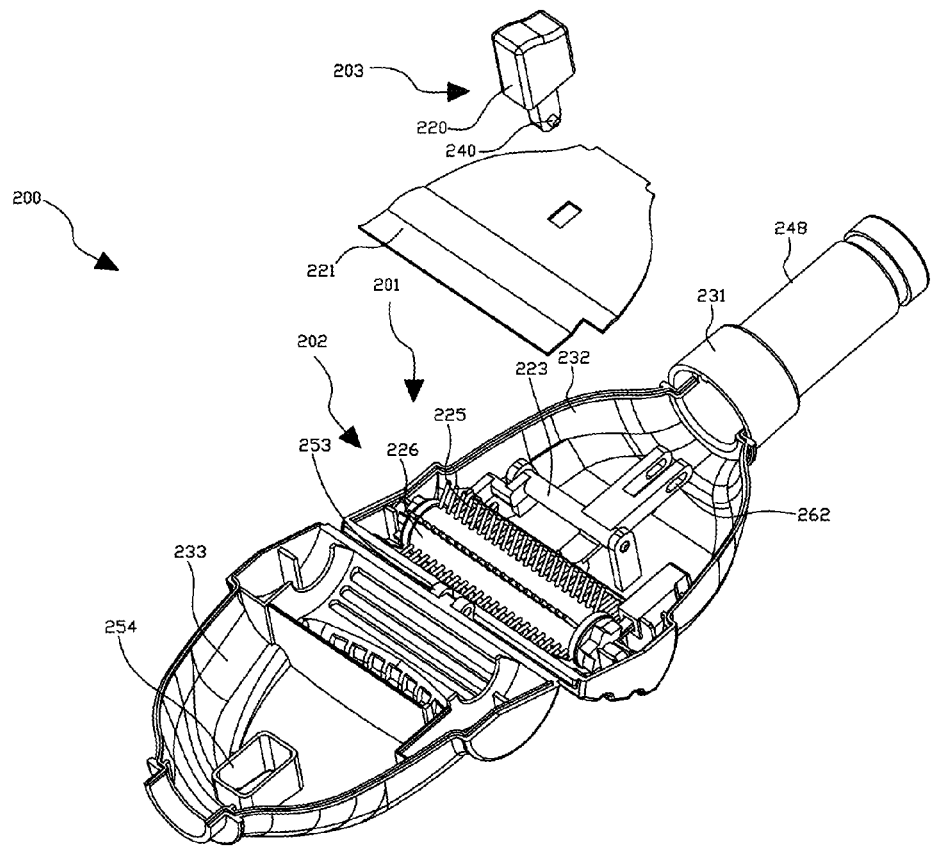
FIG. 21 is a semi-exploded view of the pet groomer in embodiment 3.
Figure 23:
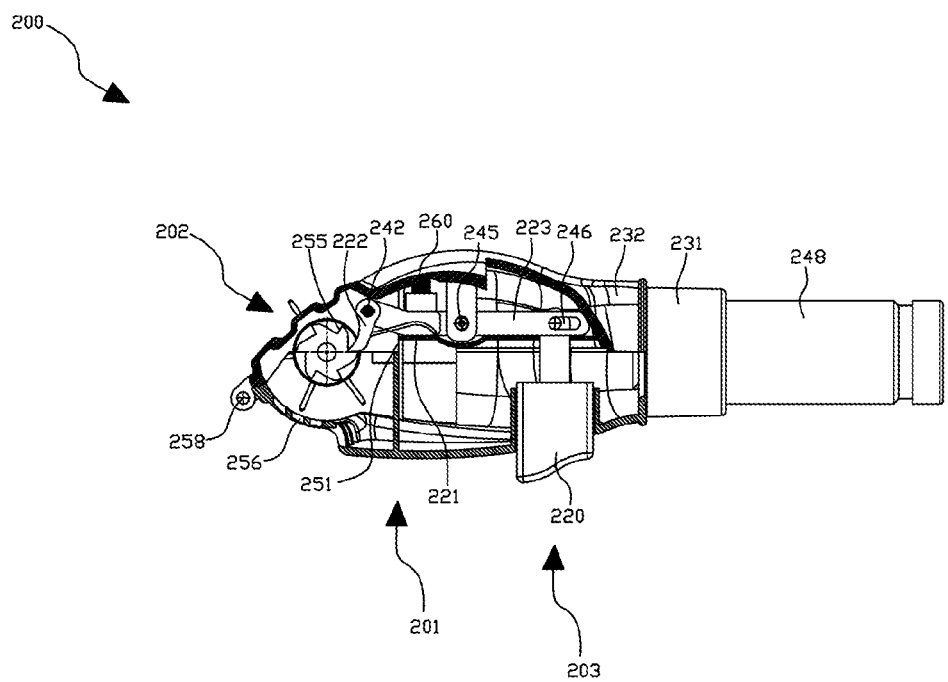
FIG. 23 is an inverted side section view of the pet groomer in embodiment 3.
Figure 24:
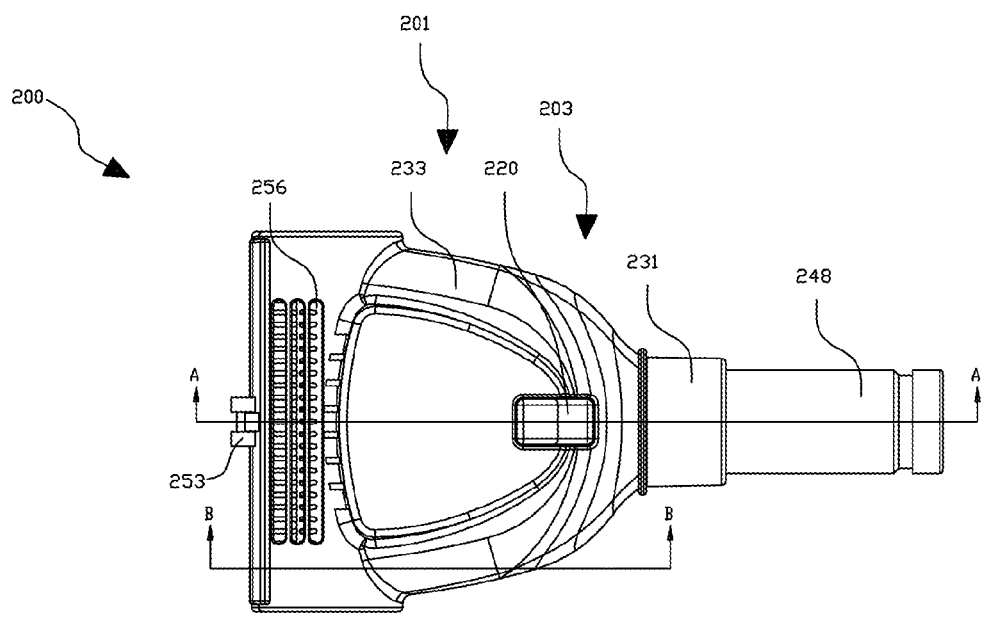
FIG. 24 is a top view of the pet groomer in embodiment 3.
Figure 25:
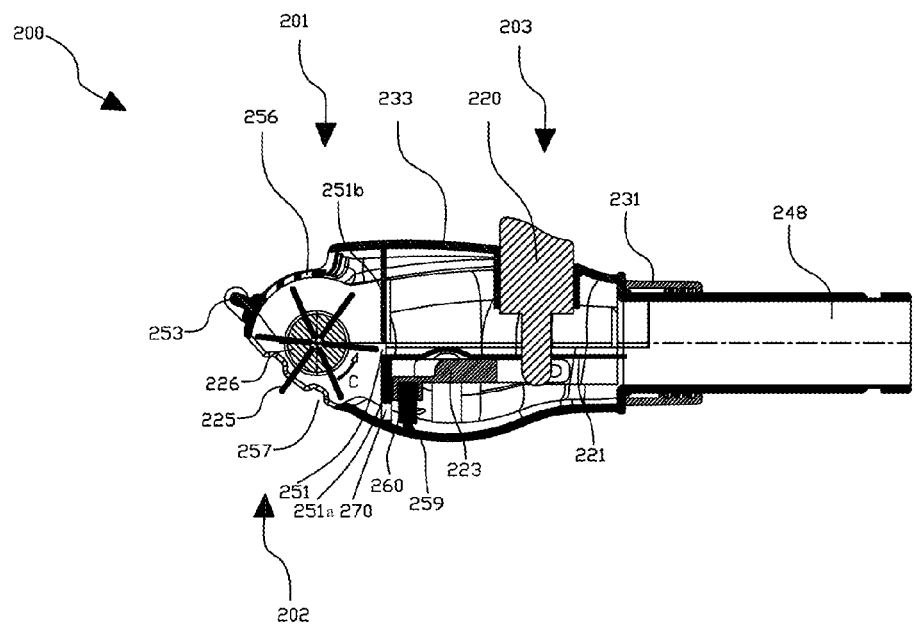
FIG. 25 is an A-A section view of FIG. 24.
Figure 26:
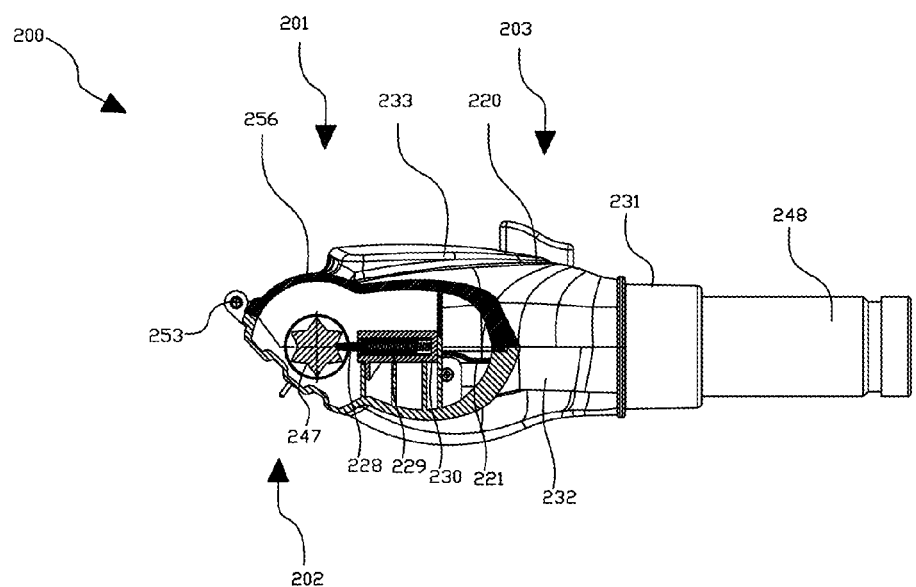
FIG. 26 is a B-B section view of FIG. 24.

FIG. 18 is a side perspective view of the pet groomer in embodiment 3; FIG. 19 is a bottom perspective view of the pet groomer in embodiment 3; FIG. 20 is an exploded view of the pet groomer in embodiment 3; FIG. 21 is a semi-exploded view of the pet groomer in embodiment 3; FIG. 23 is an inverted side section view of the pet groomer in embodiment 3; FIG. 24 is a top view of the pet groomer in embodiment 3; FIG. 25 is an A-A section view of FIG. 24; FIG. 26 is a B-B section view of FIG. 24. As shown by FIG. 18, FIG. 19, FIG. 20, FIG. 21, FIG. 23, FIG. 24, FIG. 25 and FIG. 26, a pet groomer 200 to be used together with the suction hose of vacuum cleaner includes a substance body 201, a combing assembly 202 and a driving assembly 203.

The substance body 201 has an upper covering unit 233 and a lower covering unit 232. The lower covering unit 232 is consisted of a front section and a rear section, and a suction channel 248 is set at the rear end to be connected together with the suction hose of a vacuum cleaner, and the external wall of the suction channel 248 also serves as a handle for users to operate and use the pet groomer 200; half circles 252 are set at two side ends of the front section respectively and form two circles together with the upper covering unit 233 for installing the combing assembly 202.

The front section of the lower covering unit 232 has a round hole 258, a cylinder 253 is set at the front end of the upper covering unit 233, and the cylinder 253 is installed in the round hole 258 to make the upper covering unit 233 rotate relative to the lower covering unit 232.

A locking ring 231 is also set in the substance body 201 which is used to combine the half circle structure at the rear end of the upper covering unit 233 with the corresponding circle in the junction area of the front and rear section of the lower covering unit 232 and clamp the upper covering unit 233 with the lower covering unit 232 tightly. The locking ring 231 is detachable. When it is necessary to replace the combing assembly 202 or clean the parts between the upper covering unit 233 and lower covering unit 232, demount the locking ring 231 to twist and turn the upper covering unit 233 relative to the lower covering unit 232, and obviously the combing assembly 202 installed between the upper covering unit 233 and the lower covering unit 232 is replaceable.

An air transmission channel is set in the lower covering unit 232 and connected with the suction channel 248. A primary air intake 270 is set accordingly in front of the air transmission channel to transmit air into the air transmission channel. After the upper covering unit 233 and the lower covering unit 232 are combined, the baffle 251b in upper covering unit 233 and the corresponding baffle 251a in the lower covering unit 232 form a secondary air intake 251 (See FIG. 25) to transmit air to the suction channel 248. The best preference of air intake length is, at least one air intake to be longer than the contour length of any group of comb teeth 225 distributed on rotatable body 226. A hollow front section is placed outside of the primary air intake 270 and the secondary air intake 251. A comb use opening 257 and an air leakage opening 256 are set in the hollow front section.

A separating plate 221 is fixed between the upper covering unit 233 and the lower covering unit 232, and the separating plate 221 and the lower covering unit form an driving assembly container, which is used to store the driving assembly 203, to make sure pet hairs vacuumed from the air intake enter into the suction channel 248 directly and not affect normal movements of the driving assembly.

The driving assembly 203 is formed from press-button drive assembly, which is consisted of a driving pawl 222, a connecting rod 223 and a press-button 220 which passes through the separating plate 221 and the upper covering unit 233 and is near the suction channel 248.

The connecting rod 223 has a positioning cylinder 245, a slotted hole 262 connected with the button 220, a driving cylinder 243 connected with the driving pawl 222 and a spring 260. The positioning cylinder 245 is fixed on the locating tab 250 in the lower covering unit 232. The driving cylinder 243 transmits force to move the driving pawl 222. One end of the spring 260 is fixed with the spring fixing cylinder 259 in the lower covering unit 232 to make sure the button could reset automatically after pressed down.

The button 220 has a cylinder 240 which is clamped into the slotted hole 262 in the connecting rod 223 to drive the connecting rod 223, so the user could operate the button with his thumb when holding the external wall of the suction channel 248 to drive the combing assembly 202.

A round hole 242 and a resetting spring 241 are set in the driving pawl 222, the round hole 242 is connected with the driving cylinder 243, and the resetting spring 241 is pressed on the connecting rod 223 to produce elastic force which ensures interaction between the driving pawl 222 and the combing assembly 202.

Figure 22:
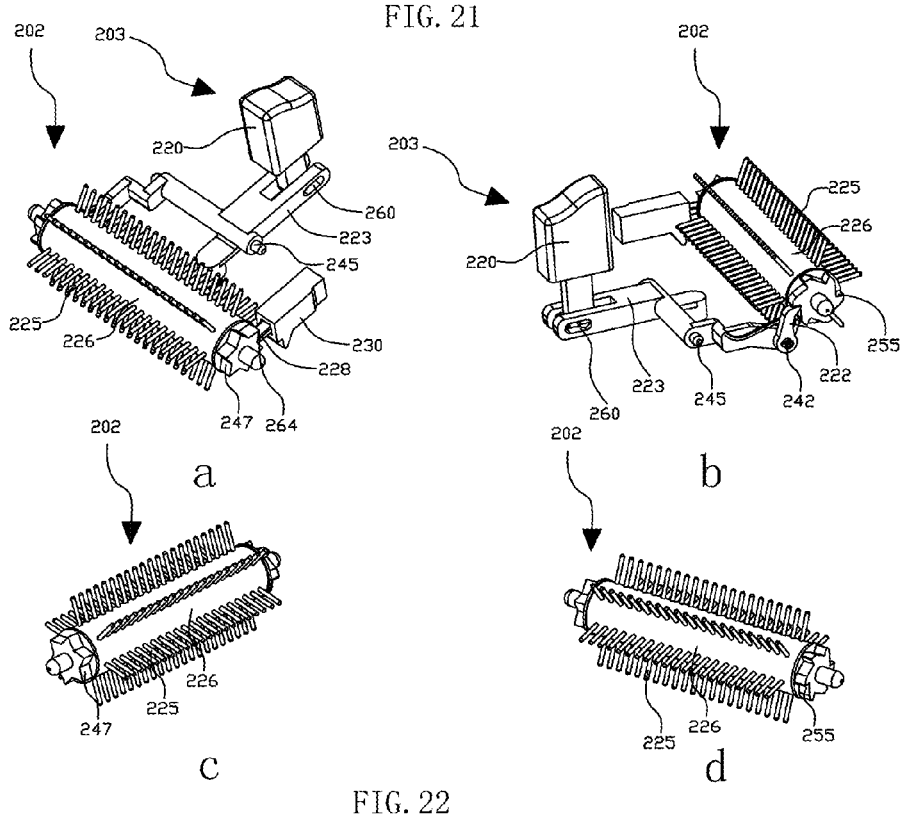
FIG. 22 is a structural illustration of the combing assembly of the pet groomer in embodiment 3.

FIG. 22 is a structural illustration of the combing assembly of the pet groomer in embodiment 3, of which views a, b, c and d are structural illustrations of the combing assembly in different directions. As shown by FIG. 22, the combing assembly 202 is consisted of a rotatable body 226 and six groups of replaceable comb teeth 225 distributed in axial direction in the rotatable body 226. The circular pitch of two adjacent groups of comb teeth 225 is 60°, of which every group includes one row of comb teeth 225. The primary air intake 270 is set at the position rotated by 60° from the comb position along direction C in FIG. 27, and the secondary air intake 251 is set at the position rotated by 120° from the comb position along direction C in FIG. 27. The comb teeth 225 which has combed pet hair is turned to the primary air intake 270 firstly and then the secondary air intake 251.

Felts 227 are installed at two ends of the rotatable body 226, so the rotatable body 226 is installed in the circle 252 between the upper covering unit 233 and lower covering unit 232 to make sure that the rotatable body 226 rotates around the axis and the rotatable body 226 is tightly combined with the upper covering unit 233 and lower covering unit 232 to avoid hairs and other sundries from flying to two sides. Obviously the rotatable body 226 is inside of the hollow front section. A group of comb teeth 225 extends outside of the comb use opening 257 to comb pet hairs.

A 6-tooth ratchet wheel 255 which meshes with the driving pawl 222 is set at one end of the rotatable body 226, and the 6-tooth ratchet wheel 255 and the driving pawl 222 constitute into a rotation angle locating section to regulate that the rotation angle of the rotatable body 226 is 60° in every time, and prevent it from reversing in use.

The pet groomer 200 also has a position limiting pawl 228, and a 6-tooth position limiting wheel 247 is set at the other end of the rotatable body 226. The 6-tooth position limiting wheel 247 and the above mentioned position limiting pawl 228, the guide holder 230 fixed between the upper covering unit 233 and the lower covering unit 232 and a spring 229 connect the two constitute into a position limiting unit. The end of the position limiting pawl 228 connected with the spring 229 is inserted into the guide holder 230, so the position limiting pawl 228 flexibly extends in the guide holder 230 under the action of the spring 229. When the rotatable body 226 rotates by 60°, the position limiting pawl 228 is meshed with the 6-tooth position limiting wheel 247 to prevent the rotatable body 226 from rotating reversely.

When the pet groomer 200 is used to comb pet hair, firstly choose the rotatable body 226 with proper length of comb teeth 225 to install in the hollow front section according to different pet hairs, and avoid scratch of pet skin owing to unsuitable lengths of comb teeth during the combing process. Or just replace comb teeth 225 in the rotatable body 226 to adapt to lengths of pet hairs to be combed.

Then connect the pet groomer 200 with a vacuum cleaner, and turn on vacuum cleaner. Then the comb use opening 257 and the air leakage opening 256 transmit airflows to the primary air intake 270 and the secondary air intake 251 at the same time, and the airflow enters into vacuum cleaner through the suction channel 248. Then the user holds the external wall of the suction channel 248 as the handle to comb pet. In the combing process, the pet body blocks the comb use opening 257, the airflow from the air leakage opening 256 to the primary air intake 270 and the secondary air intake 251 reduces suction force in comb use opening 257, so no excessive air force is in the comb use opening 257 to make pet uncomfortable when combed.

After certain amounts of hairs are accumulated on the comb teeth, press down the button 220 in the upper covering unit 233. The button 220 drives the connecting rod 223 to move through the cylinder 240, the connecting rod 223 moves around the cylinder 245 under the driving force of the button 220, the driving pawl 222 is driven to move by the cylinder 243 when the connecting rod 223 moves, the driving pawl 222 pushes the ratchet wheel 255 in the rotatable body 226 to rotate, then the rotatable body 226 is driven to rotate in direction C in FIG. 25, and the comb teeth 225 and the rotatable body 226 rotate by 60° synchronously. A new group of comb teeth 225 is at the comb position, and the user may use the group of comb teeth to comb pet continuously. The comb teeth that has combed pet is opposite the primary air intake 270 now, and the comb teeth that faced the primary air intake 270 is now opposite the secondary air intake 251, and so on, so hairs not cleared away in the primary air intake can be completely vacuumed away in the secondary air intake; as suction always acts at the comb position in the process, hairs will not drop down in the whole combing process. Besides, if one or more pieces of comb teeth 225 are damaged, new comb teeth can be used to replace the group of comb teeth.

Function and Effects of Embodiment 3

The pet groomer 200 provided by the embodiment has the press-button drive assembly to drive the rotatable body 226 and move pet hairs to the front of the primary air intake 270, so hairs are vacuumed into airflows in the comb teeth extending direction and into vacuum cleaner. As the pet groomer also has the secondary air intake 251 which further clear away hairs left from the primary air intake 270, hairs need not be stripped off from comb teeth with external force in advance and all hairs on the comb teeth can be vacuumed into vacuum cleaner by the airflow, so no loose hair can fall off from pet body in grooming to pollute environment or to transmit allergen material. Besides, the substance body is detachable and easy for internal structure cleaning; the rotatable body is replaceable, so different rotation bodies with suitable comb teeth can be installed on the pet groomer according to different pet hairs. Every group of comb teeth is replaceable, so when one or more pieces of comb teeth 225 are damaged, new comb teeth may replace damaged ones, thus being environment-protection. Plus, proper comb teeth may be chosen according to different pet hairs to make pet more comfortable and avoid hurting pet when combed. Pet hairs are moved to the air intake once the button is pressed, thus avoiding intermediate actions such as stripping off hair from comb teeth or similar actions. As a result the pet groomer 200 has the following features: simple structure, convenient use, labor saving, not tiring for use and no harm to user's health.

The locking ring 231 in the embodiment can screw back and forth, so the locking ring 231 can be meshed with the steps of the upper covering unit 233 and the lower covering unit 232, to make the upper covering unit 233 and the lower covering unit 232 are tightly clamped; the upper covering unit 233 and the lower covering unit 232 could also be connected through locking slot to make the upper covering unit 233 and the lower covering unit 232 tightly clamped.

The comb teeth 225 in the embodiment is in six groups, can also be other integral group(s), and every group may has one or more rows; the quantity of the comb teeth 225 in every row is also subject to requirements, such as 20 pieces, 30 pieces, 40 pieces, 50 pieces and 60 pieces; the diameter of the comb teeth 225 is also subject to requirements, for example, Φ 0.3, Φ 0.5, Φ 0.6, Φ 0.8, Φ 1.0, Φ 1.2, Φ 1.5, etc. The material of the comb teeth 225 is subject to requirements likewise like stainless steel 304, stainless steel 201, 45# plated steel, plastic PP, etc.; the top surface shape of the comb teeth 225 may be flat or other shape like ball shape.

The comb teeth 225 in the embodiment is of moveable structure for repair and replacement; or the comb teeth may be firstly installed on carriers and then the comb teeth carrier is connected with the rotatable body.

Embodiment 4

Figure 27:
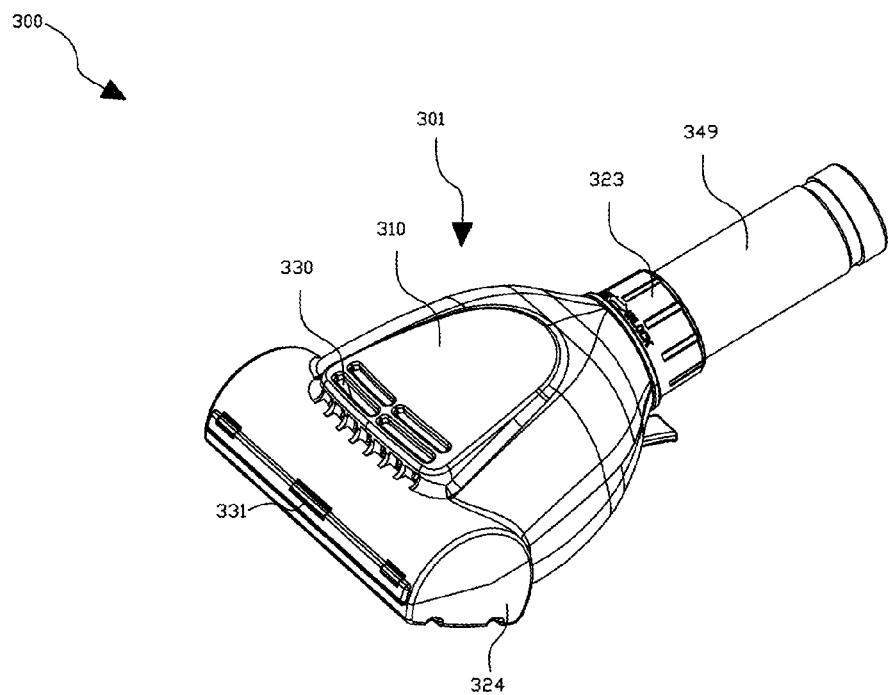
FIG. 27 is a side perspective view of the pet groomer in embodiment 4.
Figure 28:
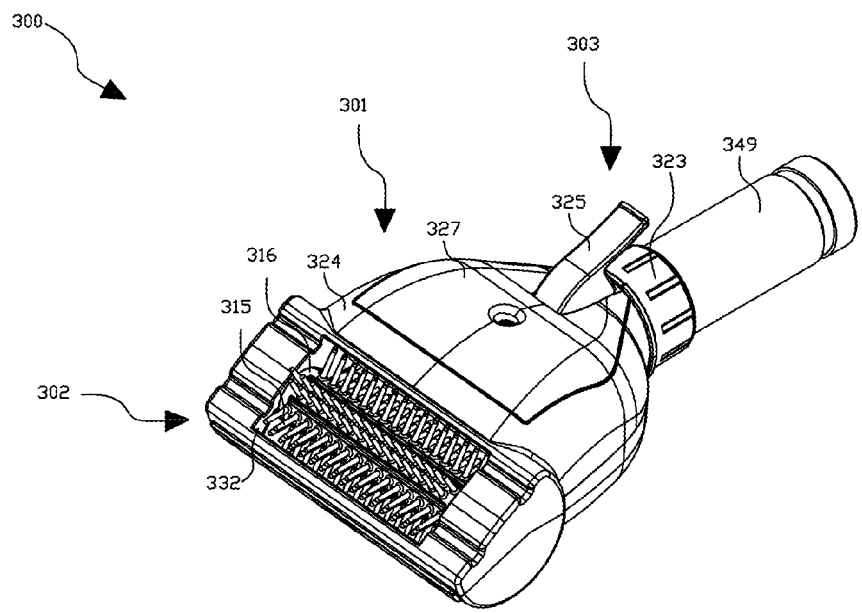
FIG. 28 is a perspective view of the pet groomer in embodiment 4, from bottom side.
Figure 29:
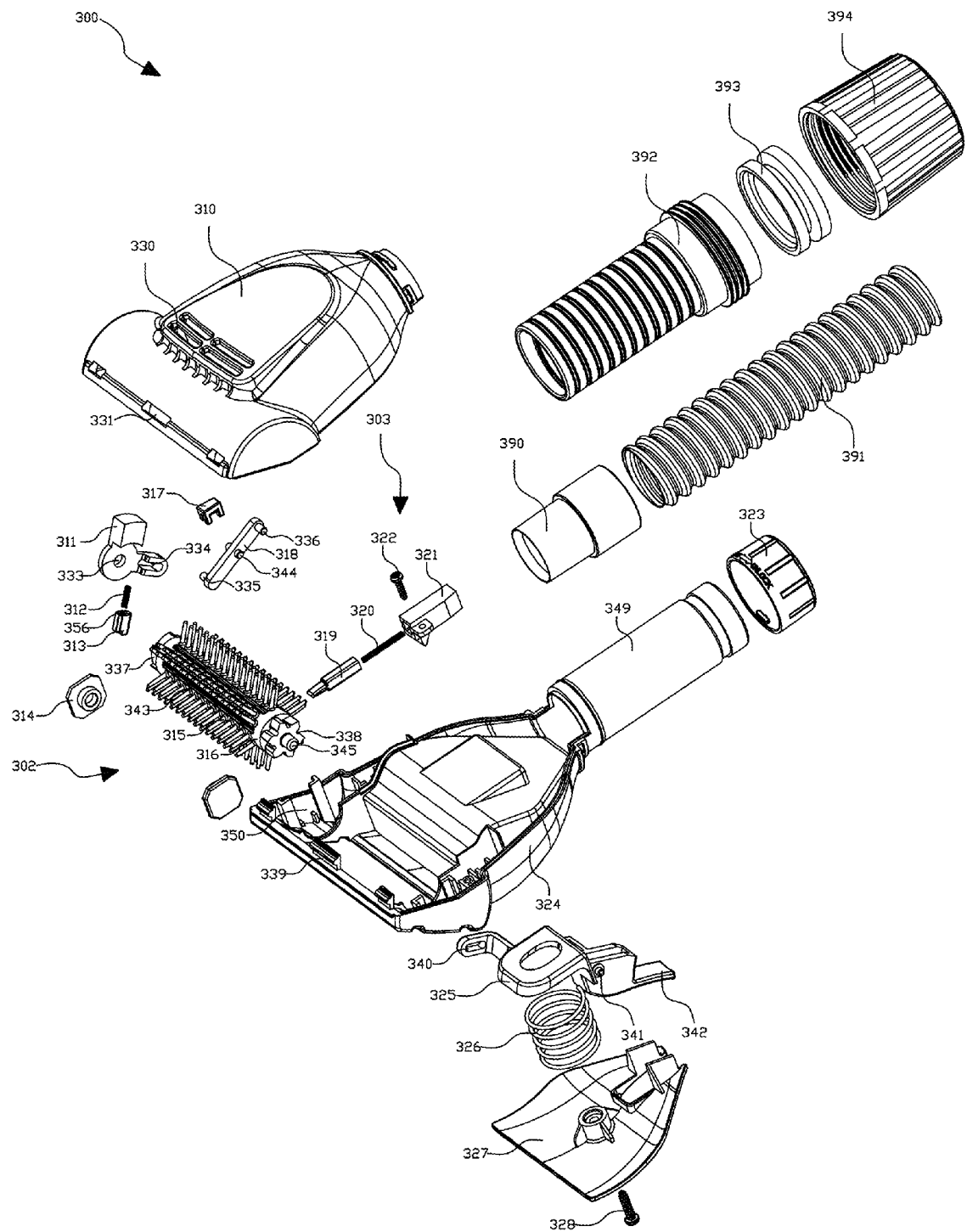
FIG. 29 is an exploded view of the pet groomer in embodiment 4;\
Figure 30:
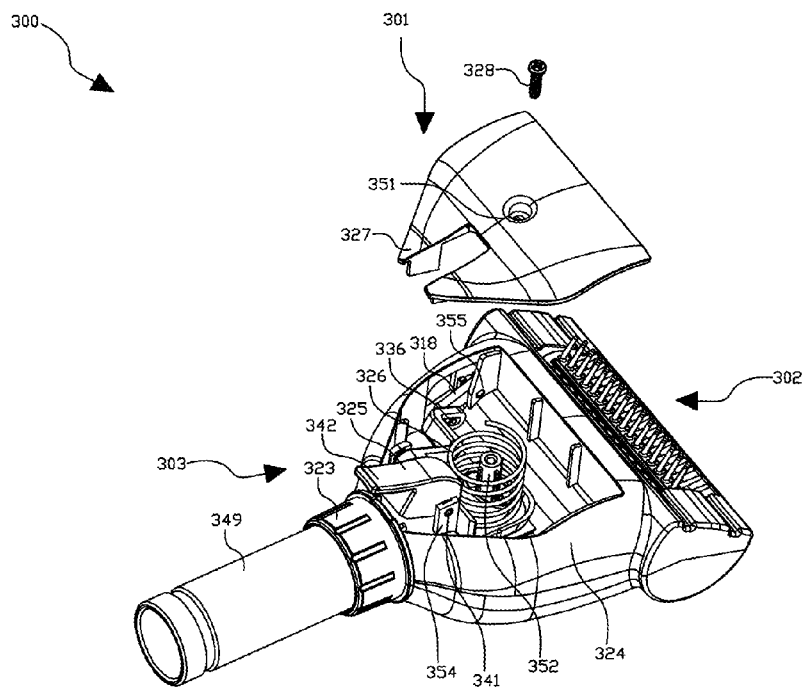
FIG. 30 is a bottom exploded view of the pet groomer in embodiment 4.
Figure 32:
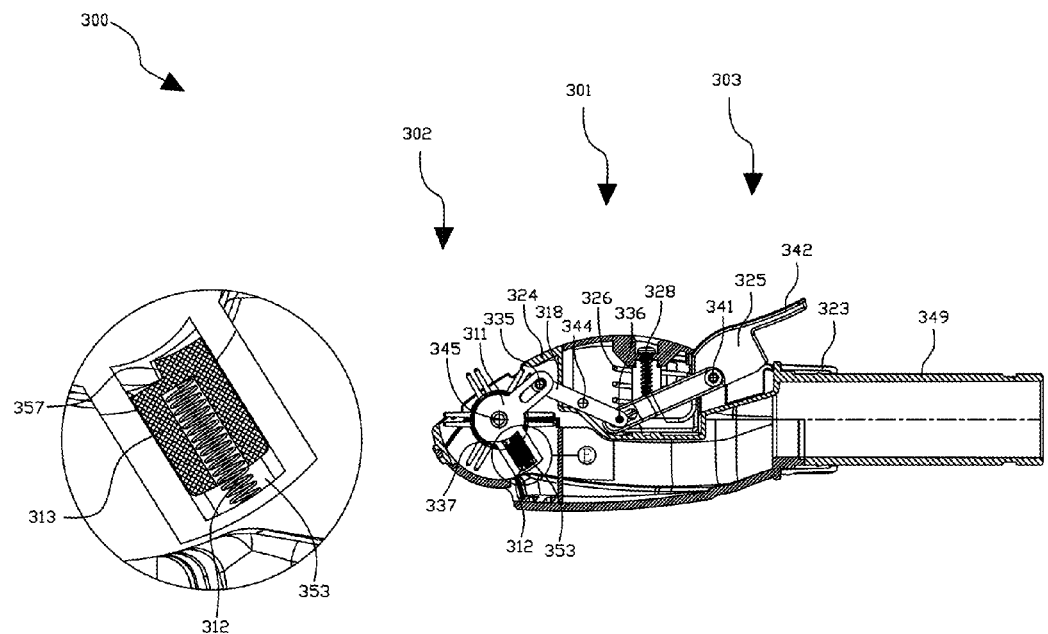
FIG. 32 is an inverted side section view of the pet groomer in embodiment 4.
Figure 33:
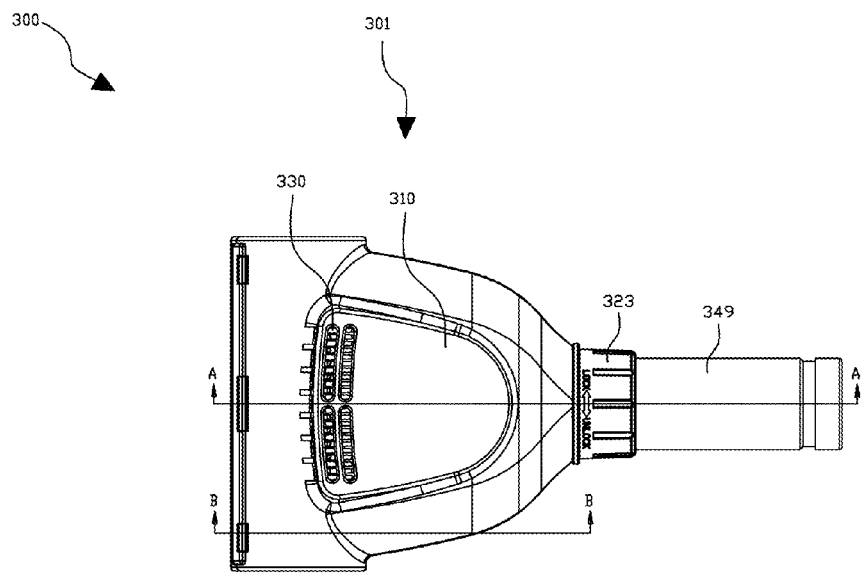
FIG. 33 is a top view of the pet groomer in embodiment 4.
Figure 34:
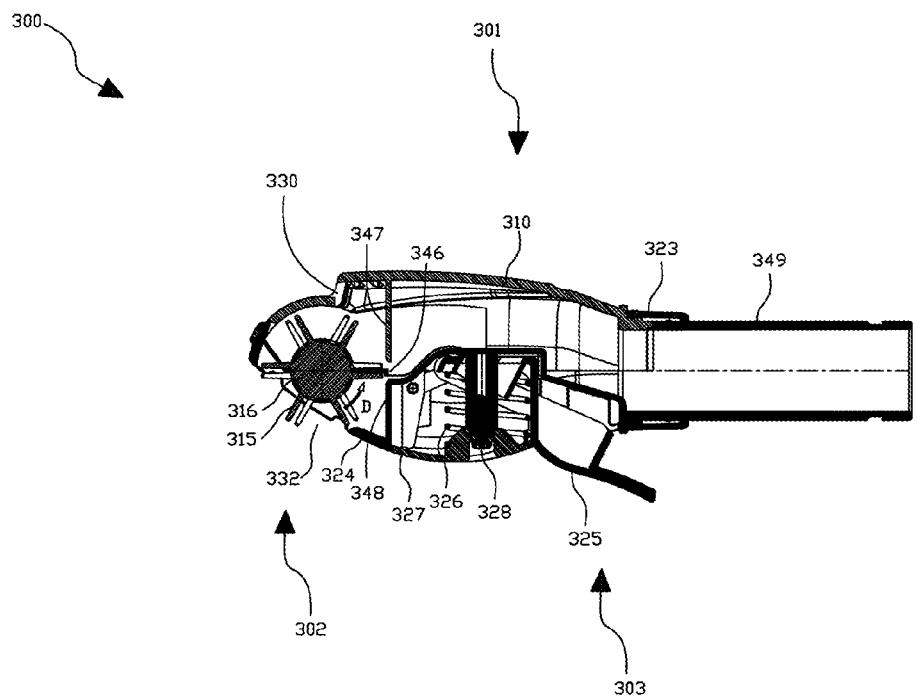
FIG. 34 is an A-A section view of FIG. 33.
Figure 35:
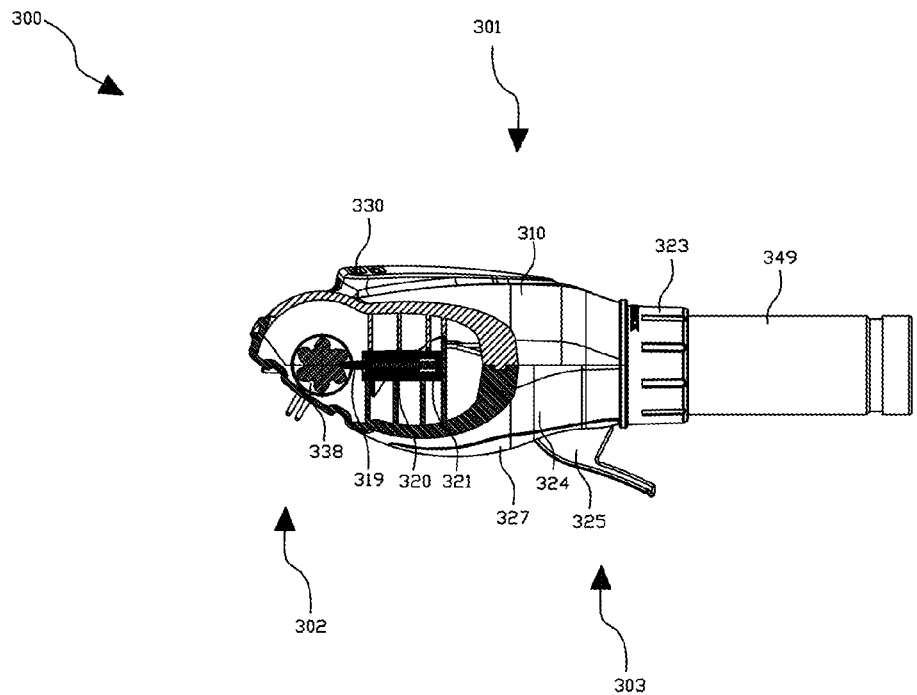
FIG. 35 is a B-B section view of FIG. 33.

FIG. 27 is a front perspective view of the pet groomer in embodiment 4; FIG. 28 is a bottom perspective view of the pet groomer in embodiment 4; FIG. 29 is an exploded view of the pet groomer in embodiment 4; FIG. 30 is a bottom exploded view of the pet groomer in embodiment 4; FIG. 32 is an inverted side section view of the pet groomer in embodiment 4; FIG. 33 is a top view of the pet groomer in embodiment 4; FIG. 34 is an A-A section view of FIG. 33; FIG. 35 is a B-B section 15 view of FIG. 33. As shown by FIG. 27, FIG. 28, FIG. 29, FIG. 30, FIG. 32, FIG. 33, FIG. 34 and FIG. 35, the pet groomer 300 for connecting with the suction hose of a vacuum cleaner includes a substance body 301, a combing assembly 302 and a driving assembly 303. The combing assembly 302 is consisted of a rotatable body 316 and multi-rows of comb teeth on the rotatable body 316. One end of the rotatable body is a 6-tooth ratchet wheel with many tooth spaces.

The substance body 301 has an upper covering unit 310 and a lower covering unit 324. The lower covering unit 324 is comprised of the front section and the rear section and a suction channel 349 is set at the rear section to be connected with the suction hose of cleaner. The external wall of the suction channel 349 also serves as a handle for users to operate and use the pet groomer 300; circles 350 are set at two side ends of the front section (See FIG. 29), and the circles 350 is used to install the end cap 314 of the rotatable body 316. Besides, the front section also has a buckle 339, a slot 331 is set at the front section of the upper covering unit 310, and the slot 331 and the buckle 339 are fastened so that the upper covering unit 310 and the lower covering unit 324 can be tightly combined together.

A locking ring 323 is also set in the substance body 301 to combine the half circle structure at the rear end of the upper covering unit 310 with the corresponding half circle at the middle of the lower covering unit 324 and clamp the upper covering unit 310 with the lower covering unit 324 tightly. The locking ring 323 is detachable. When it is necessary to replace the combing assembly 302 or clean the parts between the upper covering unit 310 and lower covering unit 324, demount the locking ring 323 to demount the upper covering unit 310 and the lower covering unit 324, and obviously the combing assembly 302 installed between the upper covering unit 310 and the lower covering unit 324 is replaceable.

After the upper covering unit 310 is combined with the lower covering unit 324, the baffle 347 in the upper covering unit 310 and the corresponding baffle 348 in the lower covering unit 324 combine and form an air intake 346 (See FIG. 34) to transmit air into the suction channel 349. The best preference for the length of air intake 346 is to be longer than the contour length of any group of comb teeth 315 distributed on rotatable body 316. A hollow front section is placed outside of the air intake 346, and a comb use opening 332 and an air leakage opening 330 are set in the hollow front section.

A back-plate 327 is set at the bottom of the lower covering unit 324, a screw hole 351 is set at the back plate 327, a screw boss 352 corresponding to the screw hole 351 is set on the lower covering unit 324, the back plate 327 is reliably connected with the lower covering unit 324 through the screw 328, and the space between the back plate 327 and the lower covering unit of the air transmission channel (i.e. driving assembly container) is used to contain the driving assembly 303.

The substance body 301 can also has a universal adaptor to be connected with vacuum cleaner (See FIG. 29). The universal adaptor includes an adapting tube 390, a flexible hose 391, an inner ring 392, a sealing ring 393 and an adjusting ring 394. The inner ring 392, the sealing ring 393 and the adjusting ring 394 constitute a universal adaptor which could adjust its inner diameter to adapt to suction hoses of different outer diameters and realize sealing connection. The adapting tube 390 can be connected with the suction channel 349 of the lower covering unit 324. The adapting tube 390 and the inner ring 392 are connected with one end of the flexible hose 391 respectively. The sealing ring 393 is for connecting the suction hose of vacuum cleaner.

The driving assembly 303 is formed from a lever drive assembly, which is consisted of a cam assembly and a connecting rod driving assembly. The connecting rod driving assembly has a connecting rod 318 and a lever 325 exposed outside of the driving assembly container.

The lever is integrated from a cap 342, a cylinder 341 and a driving track 340. The cap 342 is exposed outside of the driving assembly container and extends towards the suction channel 349. User could activate the cap 342 by grasping the external wall of the suction channel 349. The cylinder 341 is located between the cap 342 and the driving track 340 and fixed on the positioning tab 354 on the lower covering unit 324 (See FIG. 30). The driving track 340 is connected with the passive cylinder 336 of the connecting rod 318 to transmit torque force to the connecting rod 318. The connecting rod 318 has a supporting cylinder 344, the passive cylinder 336 and a driving cylinder 335, and the supporting cylinder 344 is fixed in the locating hole 355 of the lower covering unit 324 (See FIG. 30). The connecting rod driving assembly also has a connecting rod block 317 which is used to press the connecting rod 318 tightly and prevent the connecting rod 318 from falling off.

The cam assembly is consisted of a cam 311, a cam track 334 and a driving pawl unit, of which the cam 311 has an installing hole 333 (See FIG. 29) and a driving pawl chamber 353 which is integrated with the cam 311 (see FIG. 32). The rotatable body 316 has a 6-tooth ratchet wheel 337, and the cylinder 345 is installed on the side of the 6-tooth ratchet wheel 337. The cylinder 345 threads the installing hole 333 in the cam 311 and then is connected with the cap 314, so the cam 311 is able to rotate coaxially with the rotatable body 316.

The cam track 334 is engaged with the driving cylinder 335 on the connecting rod 318 and therefore the connecting rod driving assembly and the cam assembly is combined. When the connecting rod 318 rotates, the driving cylinder 335 drives the cam track 334 on the cam 311 to move towards the direction opposite to the rotation direction of said rotatable body 316, so the cam assembly rotates around the cylinder 345 on the rotatable body 316.

The driving pawl unit has the driving pawl 313, and the driving pawl 313 is meshed with the tooth space of the 6-tooth ratchet wheel 337 installed on the rotatable body 316. The driving pawl unit also includes the driving pawl chamber 353 within the cam 311 and the spring 312 of which one end is connected with the driving pawl 313 and the other end sticks to the inner wall of the driving pawl chamber 353. A spring locating hole 356 is set on the driving pawl 313, one end of the spring 312 is in the spring locating hole 356, and the other end of the spring 312 extends outside of the driving pawl 313 and sticks to the inner wall of the driving pawl chamber 353, so the driving pawl 313 acts on the surface of the 6-tooth ratchet wheel 337. The 6-tooth ratchet wheel 337 is in circular arc shape, the driving pawl sticks to the surface of the ratchet wheel constantly and moves from one tooth space to next and mesh with the next tooth space.

When the cap 342 of the lever 325 is activated, the lever 325 rotates around the cylinder 341, then the driving track 340 drives the passive cylinder 336 of the connecting rod 318 to move, then the connecting rod 318 rotates around the supporting cylinder 344, the driving cylinder 335 of the connecting rod 318 moves to drive the cam track 334 of the cam assembly to move in the peripheral direction of the rotatable body 316, the cam assembly rotates around the installing cylinder 345 of the rotatable body 316, i.e. rotating coaxially with the rotatable body. When the cam assembly rotates, the driving pawl 313 is driven to move, and the driving pawl 313 sticks to the surface of the 6-tooth ratchet wheel 337 on the rotatable body 316 and meshes with the tooth space of the 6-tooth ratchet wheel, so the driving pawl 313 drives the 6-tooth ratchet wheel 337 to rotate and the rotatable body 316 rotates around the installing cylinder 345 (See FIG. 32). When the lever 325 is released, the lever 325 rotates around the cylinder 341 to return back under the elastic force of the spring 326, and the connecting rod 318 and cam reset accordingly at the same time, this makes the cam track 334 move in the direction opposite to the rotation direction of rotatable body 316.

Figure 31:
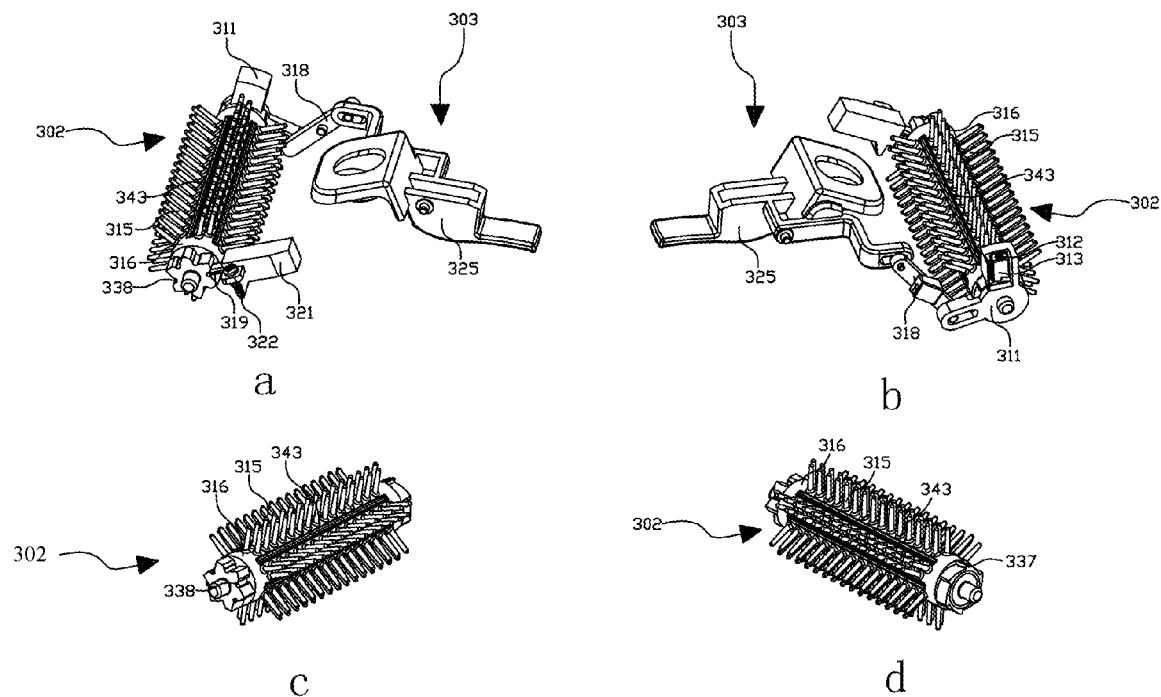
FIG. 31 is a structural illustration of the combing assembly of the pet groomer in embodiment 4.

FIG. 31 is a structural illustration of the combing assembly of the pet groomer in embodiment 4; views a, b, c and d are structural illustrations of the combing assembly in different directions. As shown by FIG. 31, the combing assembly 302 is consisted of the rotatable body 316 and six groups of comb teeth 315, the pitch of every group of comb teeth 315 is 60°, every group of comb teeth 315 is in two rows, and one group of comb teeth 315 out of the six groups of comb teeth 315 necessarily extends outside of the comb use opening 332 to comb pet hairs. Obviously a group of comb teeth 315 can have one or more rows.

Two installing cylinders 345 at two ends of the rotatable body 316 extend outwards along the axis of the rotatable body 316 to install and limit the rotatable body 316 is always inside the hollow front section.

The 6-tooth ratchet wheel 337 which mesh with the driving pawl 313 is set at one end of the rotatable body 316, and the 6-tooth ratchet wheel 337 and the cam assembly constitute a rotation angle locating section to regulate that the rotation angle by which the rotatable body 316 rotates every time is 60°, and prevent rotatable body 316 from reversing in use. The ratchet wheel may be designed as 8-tooth ratchet wheel and constitutes a rotation angle locating section together with the cam assembly to regulate that rotation angle by which the rotatable body 316 rotates every time is 45°. Obviously the shape of the ratchet wheel may be designed on requirements to realize other different rotation angles, and the best plan is to have rotation angles as integral times of 10° or 15°.

The air intake 346 is set in the position rotated by 120° in direction D in FIG. 34 from the comb position. Necessarily one group of comb teeth is fixed to right face the air intake 346 when the rotatable body rotates every time, and air intakes may be set in angles integral times of 60° or 45° if necessary.

The pet groomer 300 also has a position limiting pawl 319, and a 6-tooth position limiting wheel 338 is set at the other end of the rotatable body 316. The 6-tooth position limiting wheel 338 and the above mentioned position limiting pawl 319, the guide holder 321 fixed between the upper covering unit 310 and the lower covering unit 324 and the spring 320 connects the two constitute into a position limiting unit. The end of the position limiting pawl 319 connected with the spring 320 is inserted into the guide holder 338, so the position limiting pawl 319 flexibly extends in the guide holder 321 under the action of the spring 320. When the rotatable body 316 rotates by 60°, the position limiting pawl 319 is meshed with the 6-tooth position limiting wheel 338 to prevent the rotatable body 316 from rotating reversely. The position limiting pawl 338 may be also designed in 8-tooth, and after the rotatable body 316 rotates by 45°, the position limiting pawl 319 meshes with the 8-tooth position limiting wheel 338 and prevents the rotatable body 316 from rotating reversely.

The length of the comb teeth on the rotatable body 316 may vary. When the pet groomer is used to comb pet hair, firstly choose the rotatable body 316 which has corresponding length of comb teeth 315 to be installed inside of the hollow front section according to different pet hairs to avoid hurting pet skin due to improper lengths of comb teeth. Or replace the rotatable body 316 directly to adapt to pet hair to be combed.

When the pet groomer is used, firstly connect the pet groomer with a vacuum cleaner, and turn on the vacuum cleaner. Then the comb use opening 332 and the air leakage opening 330 transmit airflows to the air intake 346 at the same time, and the airflow enters into vacuum cleaner through the suction channel 349. In the combing process, the pet body blocks the comb use opening 332, and the airflow from the air leakage opening 330 to the air intake 346 reduces the suction force at the comb use opening 332 to the pet body and effectively preventing excessive suction from affecting the comfort level of pet. After a certain amount of hair is accumulated on the comb teeth, activate the lever 325, the lever 325 drives the connecting rod 318 through the driving track 340, the connecting rod 318 drives the cam assembly to rotate, and the cam assembly drives the driving pawl 313 to rotate on the surface of the 6-tooth ratchet wheel and extend flexibly in the axial direction of the cam under the elastic force of the spring, so the 6-tooth ratchet wheel 337 is driven to rotate, then the rotatable body 316 is driven to rotate by 60° by every activation. Then a new group of comb teeth 315 is rotated to the comb position, user may continue combing pet hair with the new group of comb teeth, and the comb teeth 315 that has combed pet hair is rotated by 60°. When a certain amount of pet hair is accumulated on the comb teeth at the comb position, activate the lever again, the present comb teeth 315 is rotated by another 60°, the previous comb teeth 315 with hair is rotated to the air intake 346, and hair will be vacuumed into the air intake 346 from the comb teeth 315, no external force is needed to strip off hair from comb teeth in advance. Because the suction acts at the comb position in the whole process, hairs will not drop down. The rotation angle of the comb teeth 315 may be other angles if necessary, and the best plan is integral multiples of 10° or 15°.

When comb teeth with hair are rotated to the position close to the air intake, in order to ensure pet hair wound on comb teeth can be vacuumed away completely, make sure every piece of comb teeth in this group points at the middle of the air intake, so the extending direction of every piece of comb teeth in the group keeps consistent with the vacuuming direction of the main suction airflow, rigorous paralleling is preferred, and make sure every piece of comb teeth in the group is inside of the main vacuuming airstream completely instead of partly, so the suction airflow could clear hairs away by overcoming only the frictional force between hair and smooth comb teeth.

Function and Effects of Embodiment 4

The driving pawl, which moves flexibly in axial direction of cam and meshes with the tooth space of the ratchet wheel, is adopted in the embodiment and constantly sticks to the surface of the ratchet wheel, moves from one tooth space to the next one, and meshes with the next tooth space to make sure the driving pawl drives the ratchet wheel to rotate by required angle, the structure is stable and reliable; besides, the pet groomer has a lever drive assembly to drive the rotatable body 316, and pet hair is moved to close to the air intake 346, so pet hair is vacuumed into vacuum cleaner in the extending direction of the comb teeth and does not need external force to strip off hair from comb teeth in advance. No loose hair can fall off from pet body in grooming to pollute environment or to transmit allergen material. Besides, the substance body is detachable and easy for internal structure cleaning; the rotatable body is replaceable, so different rotation bodies with proper comb teeth can be installed on the pet groomer according to different pet hair. Every group of comb teeth is replaceable, so when one or more pieces of comb teeth 315 are damaged, new comb teeth may replace damaged ones, thus being environment-protection. Plus, proper comb teeth may be chosen according to different pet hairs to make pet more comfortable and avoid hurting pet at the same time when combed. Pet hairs are moved to the air intake once the lever is activated, so the structure is simple and the operation is convenient. The pet groomer can be connected with the suction hose of vacuum cleaner through a flexible hose to realize convenient grooming, labor saving and not to fatigue the user easily; an adjusting ring is adopted in this case to adjust the sealing ring to be connected with the suction hose of vacuum cleaner which has different diameters, thus making the use more convenient.

In the pet groomer in embodiment 4, the external wall of the suction channel is used as the handle to grasp the pet groomer. Handles may be set in the upper covering unit or other proper positions of the pet groomer of the present invention to enable the user to operate and control the pet groomer conveniently.

The connecting rod driving assembly of the present invention extends outside of the substance body, and the part for the user to operate the pet groomer in embodiment 4 is a lever. Obviously the lever may be replaced by a press button and other driving parts.

One air leakage opening is set on the substance body of the present invention in embodiment 4, and obviously more air leakage openings may be set at other positions of the substance body if necessary to prevent excessive air force at the comb use opening from affecting the comfort level of pet when combed.

One group of comb teeth is arranged by every 60° in the present invention in embodiment 4, and altogether six groups are arranged, which could also be replaced by three groups of comb teeth uniformly distributed on the rotatable body. When the comb teeth are in three groups, the circular pitch of every group is 120° and these three groups are uniformly distributed on the rotatable body 316, after a certain amount of pet hair is accumulated on the comb teeth at the comb position, once the lever 325 is activated, the comb teeth 315 are still rotated by 60°, and there are no comb teeth 315 under combing status at the comb position, so hair from pet body or dropping to the ground may be vacuumed through the comb use opening 332. When the lever 325 is activated again, the comb teeth 315 with hair are rotated to the air intake 346, adequate suction is at the air intake 346 to vacuum pet hair from comb teeth 315 to the air intake, and meanwhile another group of comb teeth 315 is under combing status and continues to comb pet hair.

The comb teeth on the rotatable body may also be in four groups which are uniformly distributed on the rotatable body with a circular pitch of 90°. After a certain amount of pet hair is accumulated on the comb teeth at the comb position, once the lever 325 is activated, the comb teeth 315 are rotated by 45°, and there are no comb teeth 315 under combing status at the comb position, so hair from pet body or dropping to the ground may be vacuumed through the comb use opening 332. When the lever 325 is activated again, the comb teeth 315 with hair are rotated by 90° totally from beginning, and then another group of comb teeth 315 is under combing status and continues to comb pet hair. When lever 325 is activated by the 3rd time, the 1st group of comb teeth 315 with hair are rotated to the air intake 346, adequate suction is at the air intake 346 to vacuum pet hair from comb teeth 315, and meanwhile there are no comb teeth 315 under combing status at the comb position, so hair from pet body or dropping to the ground may be vacuumed through the comb use opening 332.

Comb teeth on the rotatable body may be distributed in different angles if necessary and withdrawn in correspondingly proper circular pitch. In the present invention, when the group number of comb teeth is m (m is an integral number), the quantity of tooth spaces on the ratchet wheel is recommended to be integral multiples of m.

When the comb teeth could be withdrawn in the pet groomer, in order to facilitate convenient use, an operation unit is set to the main body which sends corresponding information to inform the status of the pet groomer according to the fact whether comb teeth are at the comb position or not. When there are no comb teeth extending outside of the comb use opening, i.e. the pet groomer is under comb teeth protecting status, the operating and prompting unit sends corresponding signals to inform the user of the comb teeth protecting status, and after the lever is activated for n (n is an integral number) times, one group of comb teeth extends outside of the comb use opening; when one group of comb teeth is at the comb use opening, i.e. the pet groomer is under combing status, the operating and prompting unit sends corresponding signals to inform the user of the combing status, the user could comb pet hair, and if the comb teeth need to be withdrawn in the pet groomer, the lever should be activated form (m is an integral number) times. Obviously under two circumstances that three groups of comb teeth are set when the rotation angle is 60° and four groups of comb teeth are set when the rotation angle is 45°, when there are no comb teeth at the comb position, i.e. the pet groomer is under comb teeth protecting status, the operating and prompting unit sends corresponding signals to inform the user of the comb teeth protecting status, and the connecting rod driving assembly is driven to make one group of comb teeth extend outside of the comb use opening; when one group of comb teeth is under combing status at the comb position, i.e. the pet groomer is under combing status, the operating and prompting unit sends corresponding signals to inform the user of the combing status, the user could comb pet hair, and if the comb teeth need to be withdrawn in the pet groomer, the connecting rod driving assembly should be driven for one time.

As a specific plan, we may adopt indicators of two different colors to send corresponding signals, and give further descriptions about indicators with words or graphs.

Besides, if one or more pieces of comb teeth 315 are damaged, new comb teeth can be used to replace or just turn to a new rotatable body with proper comb teeth.

The locking ring 323 in the embodiment connects the upper covering unit 310 with the lower covering unit 324 through the locking groove to make the upper covering unit 310 and the lower covering unit 324 tightly locked.

The comb teeth 315 in embodiment 4 are in six groups, and it can also be in other integral group(s), for example, three groups, four groups, eight groups, etc., and every group may has one or more rows; the quantity of the comb teeth 315 in every row is also subject to requirements, such as 20 pieces, 30 pieces, 40 pieces, 50 pieces and 60 pieces; the comb teeth of different rows may be distributed on the rotatable body in a staggered arrangement way.

Besides, six groups of comb teeth 315 in the embodiment all are distributed perpendicular to the rotatable body, so the pointing direction (i.e. the extending direction of the comb teeth) of every group of comb teeth when rotated to the air intake is consistent with the main direction of the airflow which is vacuumed into the air intake. In the pet groomer of the present invention, the comb teeth may be distributed in the rotatable body in other forms (such as curve extending way), as long as every piece of comb teeth in the group points at the air intake and gets in the main channel of vacuuming airflow when rotated to the front of air intake.

The diameter of the comb teeth in the present invention is also subject to requirements, for example, Φ0.3, Φ0.5, Φ0.6, Φ0.8, Φ1.0, Φ1.2, Φ1.5, Φ1.8, Φ2.0, Φ2.5 etc.; the material of the comb teeth 315 is subject to requirements likewise like stainless steel 304, stainless steel 201, 45# chromed steel, plastic PP, plastic PVC etc.; in order to prevent plastic comb teeth 315 from producing static electricity, antistatic agent may be added to the material, or static may be eliminated by adding a metal strip. The top surface shape of the comb teeth 315 may be flat or other shape like ball-shape. Some rectangular or round ventilating slots may be added to the surface of the rotatable body 316 to help vacuuming pet hair on the comb teeth. The rotatable body surface may have some grooves 343 to clear away pet hair which is winded on the rotatable body more easily.

The comb teeth 315 may be firstly connected with comb teeth base plate, then the comb teeth base plate assembled on the rotatable body 316, and the comb teeth base plate and the rotatable body 316 can also be connected through a pressing plate, etc. Of course the comb teeth 315 may also be installed on other carriers and then on the rotatable body. The comb teeth 315 may be a movable structure convenient for repair and replacement, or directly fixed in the comb teeth rotatable body 316.

Besides, the lower covering unit 324 and the bottom back plate 327 may be connected in others ways, such as through a buckle or ultrasonic welding.

It will be appreciated by those skilled in the art that changes could be made to the embodiments described above without departing from the broad inventive concept thereof. It is understood, therefore, that this invention is not limited to the particular embodiments disclosed, but it is intended to cover modifications within the spirit and scope of the present invention as defined by the appended claims.

We claim:

1. A pet groomer which is used in conjunction with the suction hose of a vacuum cleaner, comprising:
    a substance body which has a suction channel to be connected with said suction hose and has at least one air intake to transmit air to said suction channel;
    a combing assembly which is used to comb pet hair; and
    a driving assembly which drives said combing assembly so as to make comb teeth in said combing assembly rotate between said air intake and a comb position;
    wherein the substance body is configured to isolate the driving assembly from an airflow toward the suction channel;
    wherein the driving assembly comprises:
        an actuator element arranged between said at least one air intake and the suction channel, the actuator element being located proximal to the suction channel and exposed out of the substance body;
        a motion transmission component extending from the actuator element towards the combing assembly; and
        wherein said at least one air intake is set behind a movement locus of a tip of any group of comb teeth.

2. The pet groomer according to claim 1, wherein said substance body also has a hollow front section which is placed outside of said air intake, and said hollow front section has a comb use opening;
    said combing assembly is consisted of a rotatable body and a plurality of groups of said comb teeth arranged in the axial direction of said rotatable body, said rotatable body is installed inside of said hollow front section, at least one group of said comb teeth extends outwards from said comb use opening to comb pet hair, and a rotation accepting assembly is set at one end of said rotatable body;
    said driving assembly is formed from a lever drive assembly which has a connecting rod driving unit and a lever connected with said connecting rod driving unit, and said connecting rod driving unit is meshed with said rotation accepting assembly.

3. The pet groomer according to claim 2, wherein said rotation accepting assembly is a ratchet wheel, said connecting rod driving unit has a driving pawl meshed with said ratchet wheel, and said ratchet wheel and said driving pawl constitute a rotation angle locating section which regulates the rotation angle of said rotatable body.

4. The pet groomer according to claim 3, wherein said ratchet wheel is a 6-tooth ratchet wheel, and when said lever is activated for one time, said rotatable body will be driven to rotate by 60°;
    said comb teeth are in six groups, the pitch between two neighbor groups is 60°, and said air intake is set at the place 60° rotated from said comb position.

5. The pet groomer according to claim 3, wherein a position limiting pawl is also included, a 6-tooth position limiting wheel is also set at the other end of said rotatable body, said position limiting pawl and said 6-tooth position limiting wheel constitute a position limiting unit to ensure that said rotatable body rotates by said rotation angle.

6. The pet groomer according to claim 2, wherein said substance body also has an actuator retainer which is formed along and separated apart from said suction channel, said actuator retainer is adjacent to said hollow front section and used to contain said driving assembly, and said lever is exposed outside of said actuator retainer.

7. The pet groomer according to claim 2, wherein said hollow front section also has an air leakage opening which prevents excessive air force in said comb use opening from affecting comfort level of pets when combed.

8. The pet groomer according to claim 1, wherein said combing assembly is consisted of a rotatable body and a plurality of groups of said comb teeth arranged in the axial direction of said rotatable body, and a ratchet wheel with more than one tooth space is set on one end of said rotatable body;
   said driving assembly is consisted of a cam assembly and a connecting rod driving assembly;
   said cam assembly has a cam coaxial with said rotatable body, a cam track which is integrated with said cam, and a driving pawl unit which is set on said cam;
   said driving pawl unit has a driving pawl which is meshed with said tooth space;
   said connecting rod driving assembly is engaged with said cam track and drives said cam track to move, so said driving pawl can mesh with said tooth space.

9. The pet groomer according to claim 8, wherein said driving pawl unit has a driving pawl chamber which is integrated with said cam and used to contain said driving pawl, and has a spring with one end supported by the internal surface of said driving pawl chamber;
   said connecting rod driving assembly is engaged with said cam track to drive said cam track to move in the direction opposite to the rotation direction of said rotatable body, so said driving pawl acts on the surface of said ratchet wheel with the elastic force of said spring, always presses on the surface of said ratchet wheel flexibly in the radial direction of said cam, moves from one said tooth space to next one, and meshes with said next tooth space.

10. The pet groomer according to claim 9, wherein a spring retaining slot is set at one end of said driving pawl, the other end of said spring is in said spring retaining slot, and said driving pawl always presses on the surface of said ratchet wheel in the radial direction of said cam with the elastic force of said spring, and moves from one said tooth space to said next tooth space.

11. The pet groomer according to claim 8, wherein said substance body also has a hollow front section which is placed outside of said air intake, said hollow front section has a comb use opening, said rotatable body is installed inside of said hollow front section, and said comb teeth rotated to said comb position extends outside of said comb use opening to comb said pet hair.

12. The pet groomer according to claim 11, wherein said cam assembly and said ratchet wheel constitute a rotation angle locating section which is used to regulate the rotation angle of said rotatable body.

13. The pet groomer according to claim 12, wherein said ratchet wheel is a 6-tooth ratchet wheel, said rotation angle is 60°, and at least one said air intake is set at the position integral multiples of 60° rotated from said comb position.

14. The pet groomer according to claim 13, wherein said comb teeth are in six groups, the pitch between two neighbor groups is 60°, every group of comb teeth has two rows of stagger arrangement, and said air intake is set in the position rotated by 120° from said comb position.

15. The pet groomer according to claim 13, wherein said comb teeth are in three groups, the pitch between two neighbor groups is 120°, said air intake is set at the position rotated by 120° from said comb position, when the first group of said comb teeth extends outside of said comb use opening, said rotatable body rotates for two times, and when the second group of said comb teeth is rotated to said comb position, said first group of comb teeth is rotated to the position right against said air intake; when said rotatable body rotates for one time, said comb teeth is rotated to the position with 60° of pitch from said comb position and therefore withdrawn in said hollow front section to protect said comb teeth.

16. The pet groomer according to claim 15, wherein an operating and prompting unit is also included which sends corresponding information according to the fact whether said comb teeth are at said comb position or not and informs the user the status of said pet groomer;
   when no comb teeth are in said comb position, i.e. said pet groomer is under the status of protecting said comb teeth, said operating and prompting unit sends corresponding signals to inform the user it is protecting said comb teeth status, and then drives said connecting rod driving assembly, so a group of said comb teeth will extend outside of said comb use opening;
   when a group of comb teeth in said comb position is at said comb use opening, i.e. said pet groomer is under combing status, said operating and prompting unit sends corresponding signals to inform the user the combing status available to comb pet hair; if said comb teeth need to be withdrawn and hidden in said pet groomer, said connecting rod driving assembly should be driven.

17. The pet groomer according to claim 13, wherein a position limiting pawl is also included, a 6-tooth position limiting wheel is also set at the other end of said rotatable body, and said position limiting pawl and said position limiting wheel constitute a position limiting unit which ensures that said rotatable body rotates by said rotation angle.

18. The pet groomer according to claim 11, wherein said substance body also has a driving assembly container which is formed along and separated apart from said suction channel, said driving assembly container is adjacent to said hollow front section and used to contain said driving assembly, and said connecting rod driving assembly has any one of a lever and a press-button which is exposed outside of said driving assembly container.

19. The pet groomer according to claim 11, wherein said substance body also has at least one air leakage opening which prevents excessive air force in said comb use opening from affecting comfort level of pet when combed.

20. The pet groomer according to claim 8, wherein said substance body also has a flexible hose which is connected with said suction channel and a universal adaptor which connects said flexible hose with said suction hose, and said universal adaptor regulates its inner diameter flexibly to ensure tight connection between said flexible hose and said suction hose.

21. A vacuum cleaner, comprising:
   a suction hose; and
   the pet groomer of claim 1 to be used in conjunction with said suction hose.

* * * * *